(12) United States Patent
Zinaty et al.

(10) Patent No.: US 8,965,079 B1
(45) Date of Patent: Feb. 24, 2015

(54) REAL TIME DETECTION OF GASTROINTESTINAL SECTIONS AND TRANSITIONS OF AN IN-VIVO DEVICE THEREBETWEEN

(75) Inventors: Ofra Zinaty, Haifa (IL); Eduard Rudyk, Haifa (IL)

(73) Assignee: Given Imaging Ltd., Yoqneam (IL)

( * ) Notice: Subject to any disclaimer, the term of this patent is extended or adjusted under 35 U.S.C. 154(b) by 608 days.

(21) Appl. No.: 13/247,046

(22) Filed: Sep. 28, 2011

Related U.S. Application Data

(60) Provisional application No. 61/387,108, filed on Sep. 28, 2010.

(51) Int. Cl.
*G06K 9/00* (2006.01)

(52) U.S. Cl.
USPC ............. 382/128; 382/100; 382/181; 345/45; 345/61; 345/65

(58) Field of Classification Search
None
See application file for complete search history.

(56) References Cited

U.S. PATENT DOCUMENTS

| | | | |
|---|---|---|---|
| 4,278,077 A | 7/1981 | Mizumoto |
| 4,854,328 A | 8/1989 | Pollack |
| 5,209,220 A | 5/1993 | Hiyama et al. |
| 5,331,551 A | 7/1994 | Tsuruoka et al. |
| 5,572,252 A | 11/1996 | Naka et al. |
| 5,596,366 A | 1/1997 | Takashima et al. |
| 5,604,531 A | 2/1997 | Iddan et al. |
| 5,647,368 A | 7/1997 | Zeng et al. |
| 5,649,021 A | 7/1997 | Matey et al. |
| 5,738,110 A | 4/1998 | Beal et al. |
| 5,833,603 A | 11/1998 | Kovacs et al. |
| 5,873,830 A | 2/1999 | Hossack et al. |
| 5,993,378 A | 11/1999 | Lemelson |

(Continued)

FOREIGN PATENT DOCUMENTS

| | | |
|---|---|---|
| GB | 2 374 149 | 10/2002 |
| WO | WO99/30610 | 6/1999 |
| WO | WO 02/082979 | 12/2001 |

OTHER PUBLICATIONS

Igual et al., "Automatic Discrimination of Duodenum in Wireless Capsule Video Endoscopy", 2009, 4th European Conference of the International Federation for Medical and Biological Engineering, IFMBE Proceedings vol. 22, pp. 1536-1539.*

(Continued)

*Primary Examiner* — Matthew Bella
*Assistant Examiner* — Jason Heidemann
(74) *Attorney, Agent, or Firm* — Pearl Cohen Zedek Latzer Baratz LLP

(57) ABSTRACT

An in-vivo device captures images of the GI system and transfers frames to an external system for analysis. As frames are transferred from the in-vivo device to the external system frames may be classified as belonging to a particular GI section. Based on statistical analysis of the classes, a temporary determination may be made, that the in-vivo device has transitioned to a "target section", and, as a result of the temporary determination, the operation mode of the in-vivo device may temporarily change from a first mode to a second mode. If the temporary determination is followed by a determination which is based on analysis of additional classes, the determination that the in-vivo device is in the target section may be made final and the in-vivo device may remain in the second mode. Otherwise, the first operation mode may be resumed and the whole transition determination process may start anew.

20 Claims, 10 Drawing Sheets

(56) References Cited

U.S. PATENT DOCUMENTS

| | | | |
|---|---|---|---|
| 6,053,873 | A | 4/2000 | Govari et al. |
| 6,240,312 | B1 | 5/2001 | Alfano et al. |
| 6,402,689 | B1 | 6/2002 | Scarantino et al. |
| 6,428,469 | B1 | 8/2002 | Iddan et al. |
| 6,635,834 | B1 | 10/2003 | Wenner |
| 6,654,504 | B2 | 11/2003 | Lubin et al. |
| 6,709,387 | B1 | 3/2004 | Glukhovsky et al. |
| 6,900,790 | B1 | 5/2005 | Doi et al. |
| 6,939,292 | B2 | 9/2005 | Mizuno |
| 6,947,788 | B2 | 9/2005 | Gilboa et al. |
| 6,950,690 | B1 | 9/2005 | Meron et al. |
| 7,009,634 | B2 | 3/2006 | Iddan et al. |
| 7,022,067 | B2 | 4/2006 | Glukhovsky et al. |
| 7,083,578 | B2 | 8/2006 | Lewkowicz et al. |
| 7,112,752 | B1 | 9/2006 | Wenner |
| 7,136,518 | B2 | 11/2006 | Griffin et al. |
| 7,190,818 | B2 | 3/2007 | Ellis et al. |
| 7,221,388 | B2 | 5/2007 | Sudo et al. |
| 7,228,166 | B1 | 6/2007 | Kawasaki et al. |
| 7,232,410 | B2 | 6/2007 | Takahashi |
| 7,251,383 | B2 | 7/2007 | Iddan |
| 7,295,226 | B1 | 11/2007 | Meron et al. |
| 7,316,647 | B2 | 1/2008 | Kimoto et al. |
| 7,319,781 | B2 | 1/2008 | Chen et al. |
| 7,672,497 | B2 | 3/2010 | Nicponski |
| 7,684,599 | B2 | 3/2010 | Horn et al. |
| 7,885,446 | B2 | 2/2011 | Horn et al. |
| 7,970,455 | B2 | 6/2011 | Zilberstein et al. |
| 2001/0035902 | A1 | 11/2001 | Iddan et al. |
| 2001/0051766 | A1 | 12/2001 | Gazdzinski |
| 2002/0042562 | A1 | 4/2002 | Meron et al. |
| 2002/0103417 | A1 | 8/2002 | Gazdzinski |
| 2002/0103425 | A1 | 8/2002 | Mault |
| 2002/0132226 | A1 | 9/2002 | Nair et al. |
| 2002/0173718 | A1 | 11/2002 | Frisch et al. |
| 2002/0198439 | A1 | 12/2002 | Mizuno |
| 2003/0016864 | A1 | 1/2003 | McGee et al. |
| 2003/0020810 | A1 | 1/2003 | Takizawa et al. |
| 2003/0077223 | A1 | 4/2003 | Glukhovsky et al. |
| 2003/0142753 | A1 | 7/2003 | Gunday |
| 2004/0073087 | A1 | 4/2004 | Glukhovsky et al. |
| 2004/0111011 | A1 | 6/2004 | Uchiyama et al. |
| 2004/0115877 | A1 | 6/2004 | Iddan |
| 2004/0180391 | A1 | 9/2004 | Gratzl et al. |
| 2004/0225223 | A1 | 11/2004 | Honda et al. |
| 2004/0249291 | A1 | 12/2004 | Honda et al. |
| 2004/0264754 | A1 | 12/2004 | Kleen et al. |
| 2005/0074151 | A1 | 4/2005 | Chen et al. |
| 2005/0075537 | A1 | 4/2005 | Chen et al. |
| 2005/0075551 | A1 | 4/2005 | Horn et al. |
| 2005/0148816 | A1 | 7/2005 | Glukhovsky et al. |
| 2005/0171418 | A1 | 8/2005 | Lin |
| 2005/0196023 | A1 | 9/2005 | Chen et al. |
| 2005/0215876 | A1 | 9/2005 | Chen et al. |
| 2005/0228293 | A1 | 10/2005 | Cahill et al. |
| 2005/0288594 | A1 | 12/2005 | Lewkowicz et al. |
| 2006/0050966 | A1 | 3/2006 | Nishimura et al. |
| 2006/0069317 | A1 | 3/2006 | Horn et al. |
| 2006/0155174 | A1 | 7/2006 | Glukhovsky et al. |
| 2006/0164511 | A1 | 7/2006 | Krupnik |
| 2006/0193505 | A1 | 8/2006 | Glukhovsky et al. |
| 2006/0217593 | A1 | 9/2006 | Gilad et al. |
| 2006/0239557 | A1 | 10/2006 | Cahill et al. |
| 2007/0053557 | A1 | 3/2007 | Cahill et al. |
| 2007/0135715 | A1 | 6/2007 | Inoue et al. |
| 2007/0165924 | A1 | 7/2007 | Nicponski |
| 2007/0165932 | A1 | 7/2007 | Nishimura et al. |
| 2007/0165942 | A1 | 7/2007 | Jin et al. |
| 2007/0292011 | A1 | 12/2007 | Nishimura et al. |
| 2008/0269664 | A1 | 10/2008 | Trovato et al. |
| 2009/0196476 | A1 | 8/2009 | Inoue |
| 2009/0306632 | A1 | 12/2009 | Trovato et al. |
| 2009/0318761 | A1* | 12/2009 | Rabinovitz .................... 600/118 |
| 2010/0046816 | A1 | 2/2010 | Igual-Munoz et al. |
| 2010/0166272 | A1* | 7/2010 | Horn et al. .................... 382/128 |

OTHER PUBLICATIONS

Bashar et al. "Automatic detection of informative frames from wireless capsule endoscopy images," Jan. 4, 2010, Medical Image Analysis 14,) 449-470.*

Notice of Allowance issued by the United States Patent and Trademark Office for U.S. Appl. No. 11/235,541 dated Dec. 30, 2009.

Office Action issued by the United States Patent and Trademark Office for U.S. Appl. No. 12/543,977 dated Aug. 23, 2012.

U.S. Appl. No. 13/116,447, filed May 26, 2011, Zingman, Igor et al.

U.S. Appl. No. 13/208,611, filed Aug. 12, 2011, Krupnik, Hagai et al.

U.S. Appl. No. 13/245,273, filed Sep. 26, 2011, Pfeffer, Yehuda.

Office Action issued for U.S. Appl. No. 11/235,541, dated Sep. 8, 2008.

Final Office Action issued for U.S. Appl. No. 11/235,541, dated Feb. 25, 2009.

Office Action issued for U.S. Appl. No. 12/719,601, dated Jun. 22, 2010.

Office Action issued for U.S. Appl. No. 12/543,977, dated Apr. 16, 2012.

Office Action for U.S. Appl. No. 10/493,751, dated Apr. 20, 2007.

Office Action for U.S. Appl. No. 10/493,751, dated Oct. 18, 2007.

Office Action for U.S. Appl. No. 10/493,751, dated Mar. 26, 2008.

Office Action for U.S. Appl. No. 10/493,751, dated Mar. 18, 2009.

Office Action for U.S. Appl. No. 10/493,751, dated Aug. 31, 2009.

Medscape Gastroenterology, "A Mosaic Pattern of the Descending Duodenum," Medscape Gastroenterology 2(1), 2000. http://www.medscape.com/viewarticle/405488_2, retrieved Jun. 2, 2008.

Berens et al., "Stomach, Intestine and Colon Tissue Discriminators for Wireless Capsule Endoscopy Images", Proc of SPIE, vol. 5747, pp. 283-290, 2005.

Notice of Allowance for U.S. Appl. No. 11/235,541, dated Aug. 21, 2009.

Notice of Allowance for U.S. Appl. No. 12/719,601, dated Oct. 7, 2010.

Office Action issued for U.S. Appl. No. 10/493,751, dated Aug. 13, 2009.

Office Action issued for U.S. Appl. No. 10/493,751, dated Mar. 12, 2010.

Notice of Allowance for U.S. Appl. No. 12/854,483, dated Mar. 14, 2012.

Office Action issued for U.S. Appl. No. 12/854,483, dated Nov. 28, 2011.

Office Action issued for U.S. Appl. No. 12/854,483, dated Apr. 8, 2011.

* cited by examiner

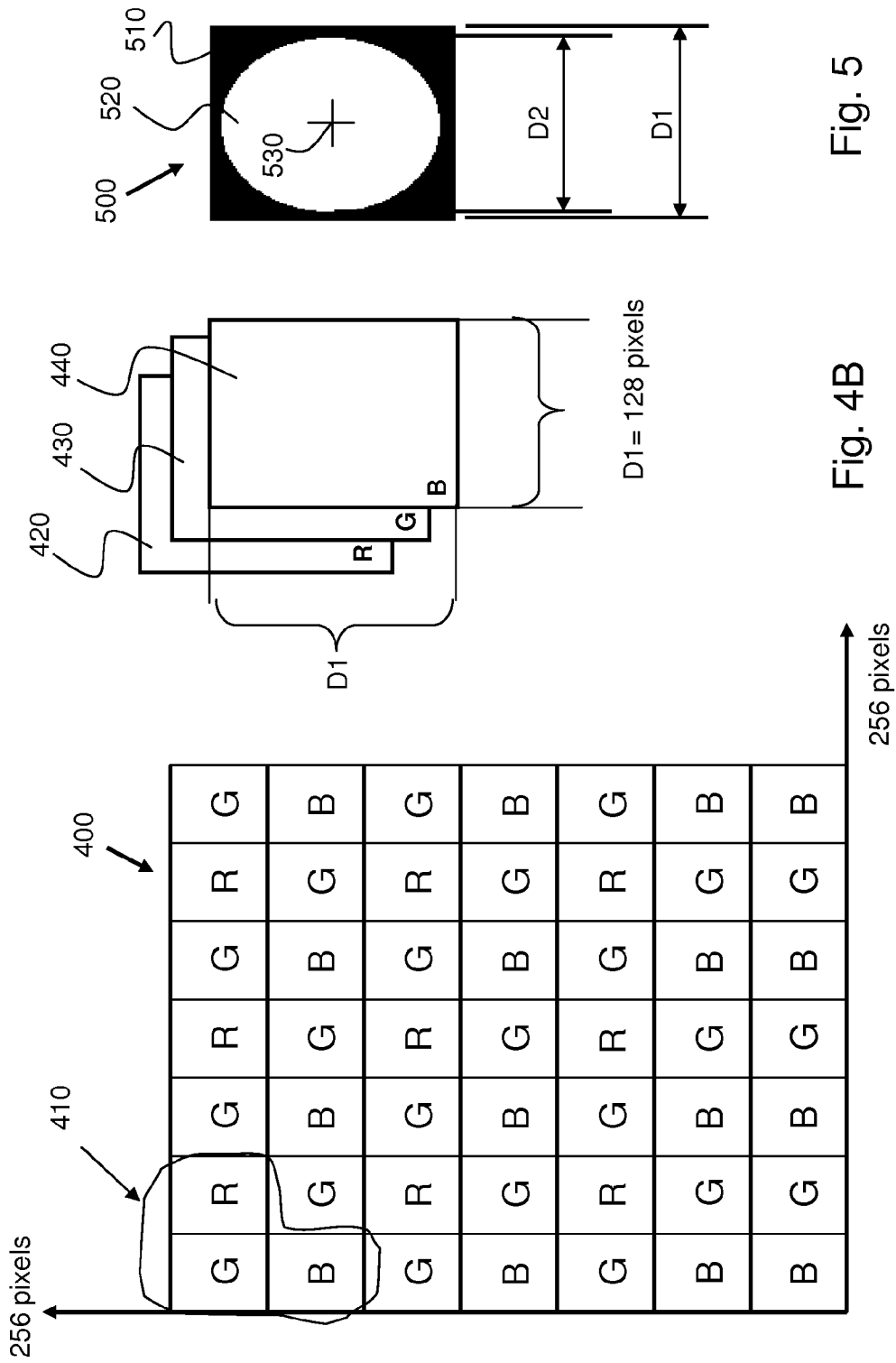

REAL TIME DETECTION OF GASTROINTESTINAL SECTIONS AND TRANSITIONS OF AN IN-VIVO DEVICE THEREBETWEEN

PRIOR APPLICATION DATA

The present application claims benefit of prior U.S. provisional Application Ser. No. 61/387,108, entitled "REAL TIME DETECTION OF GASTROINTESTINAL SECTIONS AND TRANSITIONS OF AN IN-VIVO DEVICE THEREBETWEEN", filed on Sep. 28, 2010, incorporated herein by reference in its entirety.

FIELD OF THE INVENTION

The present invention relates to real-time image processing of an image stream captured by an in-vivo device. More specifically, the present invention relates to systems and methods for detecting gastrointestinal (GI) sections and transitions of the in-vivo device from one GI section to another. The present invention also relates to systems and methods for changing a mode of operation of an in vivo device in response to such detection.

BACKGROUND

In-vivo measuring systems are known in the art. Some in-vivo devices/systems, which traverse the gastrointestinal (GI) system, include an imaging sensor, or imager, for imaging (e.g., capturing images of) the interior of the GI system. An in-vivo device may include one or more imagers.

Autonomous in-vivo devices traverse the GI system by being moved through the GI system by peristaltic force exerted by the digestive system. While an in-vivo device traverses the GI system, it uses an illumination source to illuminate areas of the GI system, and an optical system and an imaging system to capture images of these areas. In-vivo devices typically include a transmitter for wirelessly transmitting corresponding pictures to an external system where the pictures are processed, for example, to form a displayable video stream. Pictures are typically transmitted as frames. Each frame represents a captured image and contains image data corresponding to the represented captured image. Each frame may also contain or be associated with metadata that pertains to the captured image (e.g., timestamp, decimated image, imaging parameters; e.g., gain and exposure time, color manipulations results) and/or to the in-vivo device (e.g., identification of the specific in-vivo imager).

Depending on the type of GI problem a patient may be suffering from, a physician may be more interested in a particular GI section. For this and other reasons, it would be beneficial to provide to the in-vivo device and/or to a user, for example a physician, an indication that the in-vivo device has reached a particular GI section, or transitioned from one GI section to another GI section. Such indication may be used, for example, to change the mode of operation of the in-vivo device, to administer a medication, etc.

SUMMARY OF EMBODIMENTS OF THE INVENTION

An in-vivo device captures images of the GI system and generates a stream of frames for analysis. As frames are generated and transferred from the in-vivo device to an external system, typically one frame at a time, selected frames are classified, on the fly or in real-time, as belonging to a particular GI section, or for example as being a problematic frame (e.g., invalid frame or rejected frame). Classifying frames on the fly or in real time may mean in one embodiment that each frame to be classified is classified by the time the next frame to be classified is received.

Frame classes may be accumulated and a determination or decision that the in-vivo device is in a particular GI section or has transitioned from a first GI section to a second GI section may be based on statistical analysis of the accumulated frame classes. If no determination can be made by the system or method based on the current classes, new frame classes or additional frame classes may be accumulated and the statistical analysis process may start anew until a determination can be made. In response to the determination that the in-vivo device has transitioned from the first GI section to the second GI section the in-vivo device may change its mode of operation, execute a procedure, stop executing a procedure, refrain from executing a procedure, mark a frame or add a flag to a frame generated after the transition time to mark or indicate the transition, or add an alarm to a frame, etc.

In some embodiments the determination that the in-vivo device has transitioned to the second GI section may be temporary or preliminary. After a temporary, or preliminary, determination or decision is made, the in-vivo device may increase the image capturing rate and more 'dense' classes may be analyzed in order to more accurately or decisively determine whether the in-vivo device is in a particular GI section or it has transitioned to the second GI section.

In one embodiment, a system and method may select a subset of image frames for classification, and classify each non-selected image frame as an invalid image frame, and each selected image frame as related: (i) to a first GI section, or (ii) to a second GI section adjacent to the first GI section, or (iii) as a rejected image frame that is neither related to the first GI section nor to the second GI section. A statistically sufficient number of frame classes may be accumulated or stored in a storage device such as a class buffer. The stored or buffered frame classes may be analyzed statistically. It may be determined or decided (temporarily or in a decision deemed final) that the in-vivo device has transitioned from the first GI section to the second GI section based on the analysis result.

A method and system may analyze a stream of image frames, each of the frames including or representing an image captured in vivo by an in in-vivo device traversing the GI tract and including related non-image data. The method or system may sequentially (e.g., one after another, or as the data is received) classify frames from the stream of frames, as being associated with or taken from a GI region (or as being not being associated with any particular GI region) based on the image data and/or related non-image information, the classifying producing frame classes or frame assignments. The classes or assignments may be analyzed (e.g., statistically or in another way), and it may be determined whether the in-vivo device is in a particular GI section, based on the analysis. For each frame class, the frame class may be stored or buffered in a storage device such as a buffer. If the number of frame classes stored or buffered in the storage device is smaller than a threshold, e.g. a statistically sufficient number of frame classes, an additional one or more frame classes may be added to or stored in the storage device. If the number of classes stored in the storage device is equal to or greater than the statistically sufficient number of frame classes, the stored frame classes may be analyzed and it may be temporarily determined whether the in-vivo device is in a GI section based on the analysis result.

BRIEF DESCRIPTION OF THE DRAWINGS

Various exemplary embodiments are illustrated in the accompanying figures with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures:

FIG. 4A schematically illustrates an example pixel sampling setup for sampling an image captured by an in-vivo device according to an embodiment;

FIG. 4B schematically illustrates the pixel setup of FIG. 4A logically broken into its basic 'R' portion, 'G' portion, and 'B' portion according to an embodiment;

FIG. 5 shows a captured image with a mask according to an embodiment;

DETAILED DESCRIPTION

The description that follows provides various details of exemplary embodiments. However, this description is not intended to limit the scope of the claims but instead to explain various principles of the invention and the manner of practicing it. Furthermore, well known features may be omitted or simplified in order not to obscure the present invention.

Unless specifically stated otherwise, as apparent from the following discussions, it is appreciated that throughout the specification discussions utilizing terms such as "processing", "computing", "storing", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatuses may be specially constructed for the desired purposes, or may comprise computers or processors selectively activated or reconfigured by a computer program stored in the computers. Such computer programs may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. It will be appreciated that a variety of programming languages may be used to implement the teachings of the invention as described herein.

Figure 1:
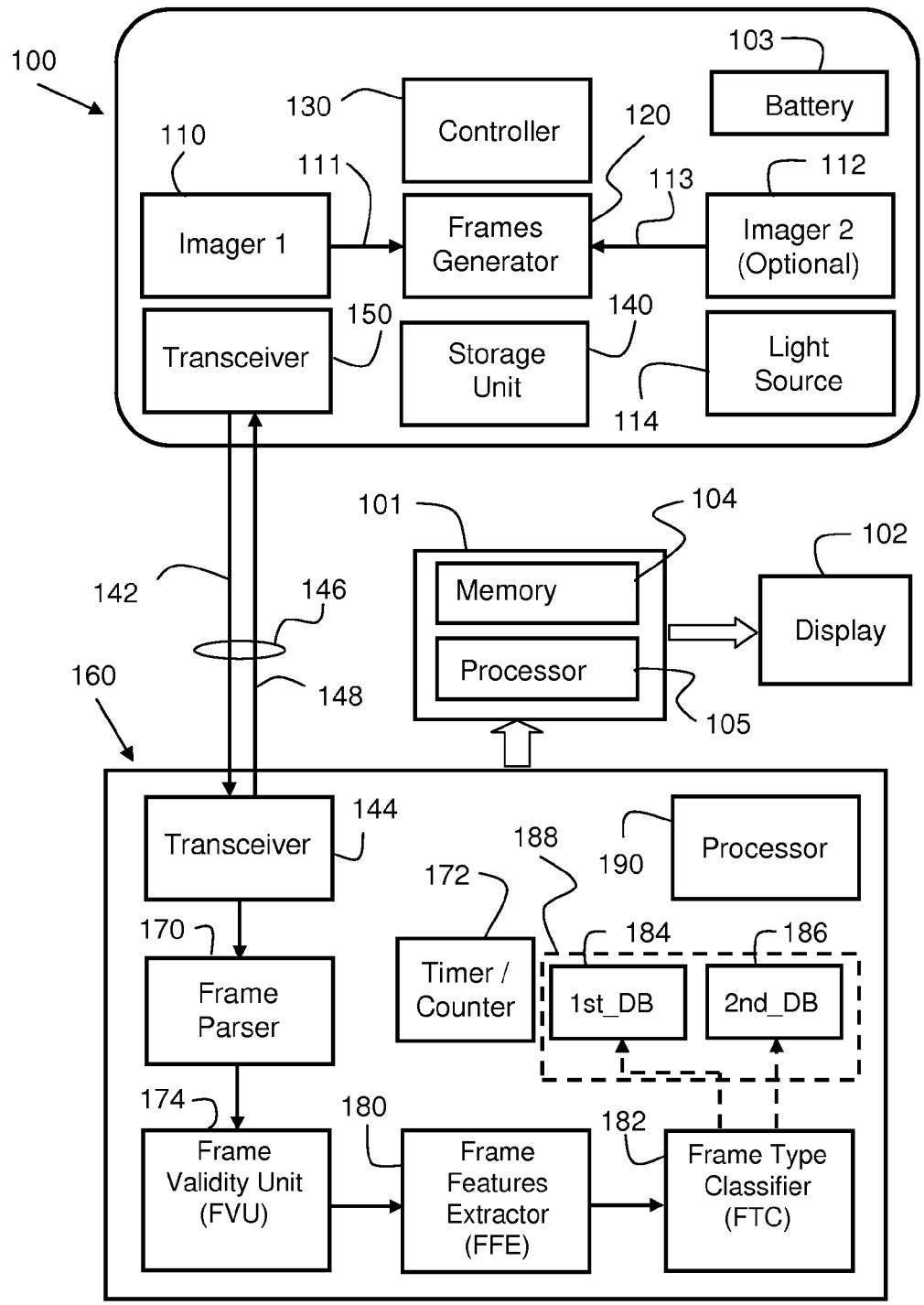
FIG. 1 is a block diagram of an in-vivo imaging system according to an embodiment.

FIG. 1 schematically illustrates an example in-vivo imaging system, according to an embodiment of the present invention. The in-vivo imaging system may include an in-vivo device 100, an external data recorder 160, a workstation 101 (e.g., personal computer), and a display 102. In-vivo device 100 may be, for example a swallowable device, capturing images and transmitting corresponding image frames to an external receiving apparatus, such as data recorder 160. The image frames may, after processing, be combined into an image stream or video movie for display to a user, for example using display 102.

An in-vivo device may have one or more imagers. One imager, referred to as "front imager", may be situated at the front side of the in-vivo device, and another imager, referred to as "rear imager", may be situated at the rear side of the in-vivo device. A front imager is an imager that views areas ahead of the in-vivo device, whereas a rear imager is an imager that views areas in other directions (e.g., in the opposite direction). Depending on the orientation of the in-vivo device in the GI system, an imager may sometimes function as a front imager and sometimes as a rear imager.

An in-vivo device may have one or more imagers and the methodology described herein may be applicable to any imager of the in-vivo device. By way of example, in-vivo device 100 may include two imagers: a first imager 110 and a second imager 112 (numbers of imagers other than one imager or two imagers may be used, with suitable modifications to the methods discussed herein). In-vivo device 100 may also include an illumination source 114, a frame generator 120, a controller 130, a storage unit 140, a transceiver 150, and a power source 103 for powering them. Power source 103 may include one or more batteries, or a charge storing device with electrical circuit that jointly facilitate transfer of electrical power from an external apparatus to the in-vivo device through electromagnetic induction. Controller 130 controllably operates illumination source 114 to illuminate areas traversed by in-vivo device 100, and coordinates the images capturing timing of imagers 110 and 112. Controller 130 may temporarily store captured images and related image frames in storage unit 140. Controller 130 may also perform various calculations and store calculation results in storage unit 140.

At the time of or shortly after in-vivo device 100 is swallowed, or after some predetermined delay (e.g., 2 minutes), imager 110 and imager 112 start capturing images of areas of the GI system. If two imagers are used, such as imager 110 and imager 112, illumination source 114 intermittently illuminates the filed-of-view ("FOV") of one imager at a time while controller 130 concurrently processes the image captured by the other imager. Because natural light does not enter the intestinal tract, imager 110 and imager 112 do not require a light shutter, as opposed to 'regular' (i.e., non-swallowable) imagers. The function of the light shutter is, therefore, implemented by the darkness inside the intestinal tract and by intermittently illuminating the FOV of imager 110, then the FOV of imager 112, then again the FOV of imager 110, etc. Typically, the exposure time of imager 110 and imager 112 is 2-3 milliseconds.

If in-vivo device 100 includes both imager 110 and imager 112, in one embodiment, controller 130 operates illumination source 114 such that only one imager can capture an image at any given time. That is, when areas of the intestinal tract which are in front of one imager (e.g., imager 110) are illuminated by illumination source 114, the areas of the intestinal tract which are in front of the other imager (imager 112, to continue the example) remain dark (e.g., not illuminated).

Each of imager 110 and imager 112 includes an image sensor (the image sensors are not shown in FIG. 1B). Each image sensor may be, or include, an array of 256×256 photo sensor elements (e.g., pixels). Imager 110 outputs image data 111 by using a pixel format corresponding to the used pixels. Image data 111 is output for each image that imager 110 captures. Likewise, imager 112 outputs image data 113 by using a pixel format corresponding to the used pixels. Image data 113 is output for each image that imager 112 captures. For convenience, pixels are normally arranged in a regular two-dimensional grid/array. By using this arrangement, many common operations can be implemented by uniformly applying the same operation to each pixel independently. Image data represents a corresponding captured image and, optionally, selected portions thereof.

Frames generator 120 receives image data 111 and, if imager 112 is used, also image data 113, and uses each item of image data to produce an image frame ("frame" for short) for the pertinent captured image. A frame typically includes a header (or other) field that contains information related to or associated with the frame itself (e.g., information identifying the frame, the serial number of the frame, the time of production of the frame, the bit-wise length of the frame, etc.). A frame may also include an uncompressed version of the image data and/or a compressed version thereof, and a decimated image. A frame may include or have associated or related to it metadata or non-image data related to or associated with the image in the frame.

Data recorder 160 may include a transceiver 144 for receiving frames transferred by in-vivo device 100, a frame parser 170 for parsing the transferred frames, a timer/counter unit 172 to count classes of frames and commence time windows, a frame validity unit ("FVU") 174 to check validity of frames, a frame feature extraction extractor ("FFE") 180 to extract image features, and if desired or required other features (e.g., features derived from non-image information), from valid frames, and a frame type classifier ("FTC") 182 to classify frames based on the extracted features. The frame classification process produces frame classes, or assigns frames to classes. By "class" is meant the type of frame; e.g., "invalid frame"; "rejected frame"; "stomach frame"; "small bowel frame"; "colon frame", etc. Other classes may be used. Each of frame parser 170, timer/counter unit 172, FVU 174, FFE 180, FTC 182 may be a dedicated hardware unit, or may be code or instructions executed by a controller/processor, e.g., controller 130, processor 190, or processor 105. The code/instructions may be distributed among two or more processors.

Data recorder 160 may also include a class buffer 188 to buffer or store frame classes, and a processor 190. Processor 190 may synchronize the operation of frame parser 170, timer/counter unit 172, FVU 174, FFE 180 and FTC 182, and analyze buffered frame classes, and whenever required reanalyze also new buffered frame classes, to decisively determine, based on the analysis results, whether or not in-vivo device 100 has transitioned from a first GI section to a second GI section. The second GI section (which is also referred to herein as the "target section") may be adjacent to or distant (i.e., non-adjacent) from the first GI section.

Sections of the GI tract when used herein may be, for example, mouth, esophagus, stomach, small bowel, large intestine, and anus. Sections may also include other anatomical regions, and may include sub-regions. For example, a section may include cecum, colon, ascending colon, right colic flexure (hepatic), transverse colon, transverse mesocolon, left colic flexure (splenic), descending colon, and sigmoid colon. Other or additional sections may be used.

If it is determined, for example by processor 190, that the in-vivo device is in a particular GI section; e.g., in the first GI section, or has transitioned to a particular GI section; e.g., to the second GI section, processor 190 may produce an indication to that effect. For example, if data recorder 160 includes a display, processor 190 may present a corresponding message (e.g., "Capsule is in the 'X' section", or "Capsule has transitioned to the 'X' section", where 'X' stands for, for example, 'stomach', "small bowel', 'colon', etc.,) on the display. Alternatively, processor 190 may send the message to display 102. An indication may be an internal signal, or a signal passed between units (such as units shown in FIG. 1). Processor 190 may also send the indication to controller 130 and controller 130 may respond to the indication accordingly, for example as described herein (e.g., change mode of operation, etc.). While when discussed herein certain steps are described as being performed by a certain processor, e.g. processor 190, in other embodiments other processors, such as processor 105 or controller 130, may carry out these steps, and in further embodiments different systems may carry out the methods disclosed herein.

Class buffer 188 may include or use a first database (e.g., "1st_DB") 184 and a second database (e.g., "2nd_DB") 186. Other numbers of databases and other types of databases may be used. First database (1st_DB) 184 may be updated with frame classes (e.g., have frame classes added to or buffered in the buffer) that are added or buffered in class buffer 186 while in-vivo device 100 operates in a first operation mode corresponding to the particular GI section. By "buffering a frame class" is meant that a frame class is added to or buffered in the buffer during operation, immediately after the frame is classified, or shortly thereafter and, in any case, before the next classifiable frame is classified.

In one embodiment, the first operation mode may involve capturing images and transferring corresponding frames at a first rate, in some embodiments at a low rate designated herein as "LFR" rate. When adding or buffering a "frame class" to a database, what is meant in one embodiment is adding a record corresponding to or recording a class to a database. Thus a database may include a series of records "class 1", "class 1", "class 1", "class 0", "class 2", "class 2", "class 2", "class 2", etc., or a series of records '1', '1', '1', '0', '2', '2', '2', '2', . . . , etc., or a series of records "stomach", "stomach", "small bowel", "small bowel", "stomach", etc. In another embodiment, the first operation mode may involve refraining from administering a medication intended for another GI section, for example to the target section. Second database (2nd_DB) 186 may be updated with frame classes that are buffered (e.g., added to) in class buffer 186 while in-vivo device 100 operates in a second operation mode corresponding to the target section. Each record/entry of the buffer may contain, among other things, a frame's identifier and/or a frame's serial number, and/or a timestamp corresponding to the image capturing time and/or to the generation time of the frame, a class of the pertinent frame as determined, for example, by FTC 182. In one embodiment, the first operation mode may involve capturing images and transferring corresponding frames at a second rate, in some embodiments at a high rate designated herein as "HFR" rate. Other numbers of frame rates, and other numbers of operational modes, may be used. In another embodiment, the second operation mode may involve administering the medication to the target section. In other embodiments applying the first operation mode and/or the second operation mode may involve other actions or additional actions, for example causing in-vivo 100 to transmit a beacon signal when it resides in the target section. That is, when processor 190 determines that in-vivo device 100 has reached, or is in, the target section, it may instruct controller 130 to transmit a unique signal that processor 190 can use as an orientation signal or as a location signal in order to facilitate, in some embodiments, various location related applications.

FVU 174, FFE 180, and FTC 182, and other methods and modules disclosed herein, may be implemented in software or in hardware, or partly in hardware and partly in software. For example, processor 190 (or another processor such as processor 105), by executing software or instructions, may carry out steps which are performed by any one of frame parser 170, timer/counter unit 172, FVU 174, FFE 180, and other functions in recorder 160, and thus may function as these units. Data recorder 160 may include additional components (e.g., USB interface, Secure Digital ("SD") card driver/interface, etc.) or units for communicating with a processing/displaying system that is configured to process the images captured by in-vivo device 100 and related data.

In one embodiment suffix (or prefix data, or other metadata such as non-image data) data may be contained in a frame, for example, as the frame's payload. In-vivo device 100 wirelessly transmits 142 a frame for each captured image via wireless communication link 146. Transceiver 144 receives 142 the transmitted frames, and frame parser 170 parses each received frame in order to extract the pertinent image data and non-image data. Suffix data, metadata, image capturing parameters (e.g., gain value, exposure time) are examples non-image data. Non-image data may also include any type of data that is related to or derived from image data, or is a manipulation of the image data. In one embodiment transceiver 144 may receive a particular frame corresponding to a particular captured image, and frame parser 170 may parse the particular frame to extract the uncompressed image and the suffix data, and, from the suffix data, the decimated image associated with, or representing the particular captured image. In-vivo device 100 may use an array of 256×256 pixels to capture images, though pixels arrays of other sizes and setups may be used.

In order for processor 190 to evaluate whether an image is an image of a particular area of the GI system (e.g., stomach, small bowel, colon, etc.), features are extracted, calculated, or derived from the image data and, optionally, from non-image data, capturing parameters, etc., and the related frame may be classified based on these features. Features may be obtained using normal images or compressed images, in which case the compressed images would have to be uncompressed to facilitate feature extraction. Using normal images is generally preferable because compressing an image and uncompressing it later may result in the image being distorted. In the context of images, by "normal" is meant unprocessed image (e.g., not compressed and then uncompressed). Some images may be ineligible, or unsuitable, for feature extraction, for example, because they are corrupted. An image that is, for example, generally too bright, or too dark, may be regarded as a corrupted image. Therefore, FVU 177 may check the validity (e.g., classification eligibility) of images, and only valid images are further processed (e.g., undergo the features extraction process, classification process, etc., as explained in more detail below).

Assuming that FVU 174 determines that a particular frame is valid, FFE 180 extracts features from it, and FTC 182 determines the class of the frame based on the extracted features. Example features are described herein. FTC 182 may erroneously determine that an image was captured in one section of the GI system while it was captured in another section. For example, it may determine that an image was captured in the stomach while it was captured in the small bowel, and vice versa. Therefore, a decision regarding the transition of in-vivo device 100 from one section of the GI system to another, for example from the stomach to the small bowel, cannot rely on frames individually. Instead, the decision regarding the transition of in-vivo device 100 from one GI section to another is based on statistical analysis of a plurality of classes, including the class of the currently received frame and classes of past frames (e.g., frames preceding the current frame). In some embodiments, in order to be able to evaluate correspondence of a current frame to a particular GI section, one or more frames following the current frame would have to be taken into account. By "a frame preceding a current frame" and "a frame following the current frame" is respectively meant a frame that is transferred by the in-vivo device: e.g., to data recorder 160, earlier and later relative to the current frame.

1st_DB 184 may include a predetermined number of entries or records, E1, where each entry/record is (to be) uniquely associated with a classified frame. In some embodiments a class may be notated as '0' to denote an invalid frame; '1' to denote a snapshot of the stomach; '2' to denote a snapshot of the small bowel, and '3' to denote a 'rejected frame'. Other classes and/or notations may be used, and other or additional GI sections may likewise be denoted. For example, a class may be notated as '4' to denote the colon; and '4.1' to denote a first subsection of the colon; and '4.2' to denote a second subsection of the colon, etc. A rejected frame may be a frame that, despite its initial eligibility for classification, cannot be classified as belonging to a GI section of interest (e.g., stomach, small bowel, etc.), or is not able to be classified to a GI section. One way of determining classification eligibility of frames is described, for example, in connection with FIG. 6, which is described below. Alternative, other or additional notations and/or GI sections or GI subsections may be used.

1st_DB 184 is initially empty, and each time a new frame is classified (e.g., by FTC 182; e.g., as being related to or associated with a particular GI section) while in-vivo device 100 captures images at the first rate, an empty entry in 1st_DB 184 may be updated (e.g. added to) with the frame's class. The fixed size of 1st_DB 184 (e.g., E1 entries) may be determined such that its content can be analyzed statistically to determine whether the in-vivo device has transitioned from one GI section to an adjacent GI section. By way of example, the content of 1st_DB 184 may be updated with frame classes in the following example order: '0', '2', '1', '1', '2', '3', '2', '3', . . . , etc. In one embodiment the order of the classes in the database has no role in the statistical analysis of the classes. 1st_DB 184 is, therefore, first filled with E1 classes, after which statistical analysis of its content may commence. The size of 1st_DB 184 may be thought of as corresponding to a fixed time window because, knowing a fixed image capturing rate, the number of frame classes buffered in it is translatable to time. For example, in some embodiments the first image capturing rate may be 2 images per second and E1 may equal to 960, to accommodate 960 classes. Accordingly, the size of 1st_DB 184 (e.g., 960 classes corresponding to 960 frame/images) may be thought of as corresponding to an 8-minute time window. The predetermined number of entries of 1st_DB 184, an example first database, may be contingent on an image capturing rate of the in-vivo device.

2nd_DB 186 is similar to 1st_DB 184 in the sense that it is also initially empty and stepwise updated with classes of frames. Each time a new frame is classified while in-vivo device 100 captures images at the second rate, an empty entry in 2nd_DB 186 may be updated with the frame class. 2nd_DB 186 may also have a minimum or initial number of entries, E2, that have to be occupied by frame classes in order to commence a statistical analysis of its content to determine, for example, whether the in-vivo device has transitioned from one GI section to an adjacent GI section. Assuming that the E2 entries of 2nd_DB 186 are filled with classes and the in-vivo device continues to capture images at the second rate, a new entry is added to 2nd_DB 186 for each new frame. The size of 2nd_DB 186 continues to grow one entry at a time; each time by a new entry that is added for a new frame that is transferred from in-vivo device 100 at the second image capturing/frame transferring rate. By increasing the number of classes that are buffered in 2nd_DB 186, the statistical basis used to determine a transition from a GI section to an adjacent GI section is enhanced to facilitate a decisive determination regarding the transition.

The minimum, or initial, size, E2, of 2nd_DB 186 may be thought of as corresponding to a minimum time window because, knowing the image capturing rate, the number of classes buffered in it is translatable to time. For example, in some embodiments the second image capturing rate is 8 images per second and E2=2,880 frame classes. Accordingly, the size of 2nd_DB 186 (e.g., 2,880 classes, corresponding to 2,880 frames/images) may be thought of as corresponding to a 6-minute time window. However, as explained above, in some embodiments the size of 2nd_DB 186 may increase over time in contrast to the size of 1st_DB 184. The initial number of entries of 2nd_DB 186, an example second database, may be contingent on an image capturing rate of the in-vivo device.

Processor 190 may use timer/counter 172 to ensure that each database (e.g., 1st_DB 184 and/or 2nd_DB 186) contains a statistically sufficient number of frame classes. If the number of frame classes in the corresponding database is statistically sufficient, processor 190 may count, or use counter 172 to count, the number of frame classes per frame type, and statistically analyze the resulting numbers to determine the GI section in-vivo device 100 is currently in (e.g., stomach, small bowel and colon), or the GI section in-vivo device 100 has transitioned to. In some embodiments, transition of in-vivo device 100 from the stomach to the small bowel is to be detected. In these embodiments, in-vivo device 100 may initially capture images and transmit corresponding frames at a relatively low rate (LFR) because it may take in-vivo device 100 some time to reach the small bowel where a higher image capturing and frame transmission rate (HFR) may be desired. Accordingly, 1 st_DB 184 may be associated with the low rate, and 2nd_DB 186 may be associated with the high rate.

Based on statistical analysis of the content of 1st_DB 184 and/or 2nd_DB 186, the statistical analysis is described below (for example in connection with FIG. 8), processor 190 may evaluate whether in-vivo device 100 has entered into the small bowel. Processor 190 may use one of the two databases to temporarily determine that in-vivo device 100 has entered into the small bowel or transitioned to a target GI section based on analysis of buffered frame classes while it continues to update the class buffer with additional one or more frame classes. In such a case, in order not to lose images of the GI section presumed to be the small bowel, and before a more decisive determination is made in this regard, processor 190 may transfer an instruction to controller 130 (e.g., through transceiver 144) to transition from the LFR mode to the HFR mode. In some embodiments, the low rate may be 14 images/frames per minute and the higher rate may be 48 images/frames per minute. Other first low rates and/or other high rates and/or additional image capturing and frames transfer rates may be used.

Processor 190 may sustain a particular image capturing rate and frame transfer rate for a minimum time window, Tw_m, before a meaningful statistical analysis may be commenced. The overall time window, Tw, during which statistical analysis may be performed, may be extended up to a maximum time window, Tw_mx. Between the two time limits Tw_m and Tw_mx processor 190 may analyze the classes accumulating in 2nd_DB 186 in order to determine whether a new frame class is to be added to 2nd_DB 186 to further enhance the classes' analysis, or the first image capturing rate (e.g., LFR) is to be reused, or the second image capturing rate (e.g., HFR) is to be maintained throughout the remaining imaging procedure.

That is, if, based on reanalysis of the content of 2nd_DB 186, processor 190 determines that in-vivo device 100 has not entered the small bowel during the maximum time window Tw_mx, processor 190 may instruct controller 130 to resume the first image capturing and frame transmission rate. Processor 190 may then continue updating 1st_DB 184 first and then 2nd_DB 186 (and occasionally 1st-DB 184 while 2nd_DB is updated) for additional captured images and transmitted frames, and statistically reanalyze their contents. However, if reevaluation of the updated 2nd_DB 186 provides indication that in-vivo device 100 is in the small bowel, processor 190 may refrain from instructing controller 130 to resume the first image capturing and frame transmission rate. That is, in-vivo device 100 may continue using the second image capture and frame transmission rate throughout the remaining GI imaging procedure.

Workstation 101 may include a display or be functionally connected to an external display, for example to display 102. Workstation 101 may receive individual frames from data recorder 160 and produce a video stream for display on, for example, display 102. Workstation 101 may include a memory, such as memory 104, for storing the frames transferred from data recorder 160, and a processor, such as processor 105, for processing the stored frames. While some processing functions herein are described as being performed by processor 190, processor 105 may perform some or all of these functions.

Figure 2:
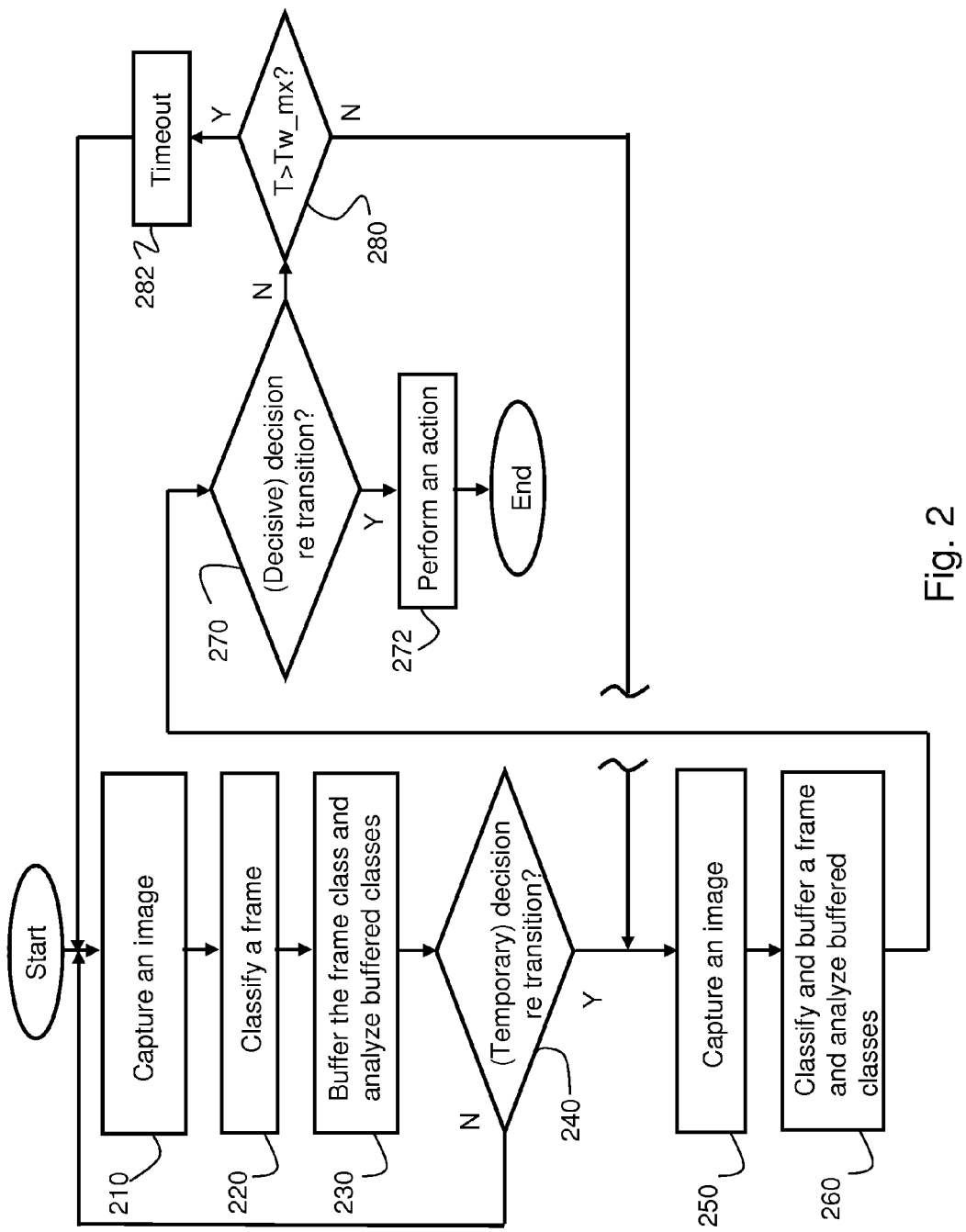
FIG. 2 shows a flowchart of a method for determining transition of an in-vivo device from one GI section to an adjacent GI section, according to an embodiment.

FIG. 2 shows a flowchart of a method for determining a transition of an in-vivo device to a target GI section according to an embodiment. FIG. 2 will be described in association with FIG. 1; however, other systems may be used with embodiments of the method of the present invention. At step 210, an image is captured, for example by in-vivo device 100, and a corresponding frame is transferred to an external apparatus, for example to data recorder 160. At step 220, the frame is analyzed, for example by FVU 174, FFE 180, and FTC 182, and the frame is classified based on the analysis. At step 230, a class buffer, for example class buffer 186, is updated with the frame's class, which means that the frame class may be buffered in or added to the class buffer, and the frame classes buffered in the buffer are statistically analyzed in order to determine whether the in-vivo device has entered into the target section.

At step 240, it is checked, based on the statistical analysis of the classes, whether the in-vivo device has entered into the target section. The statistical analysis is described below, for example in connection with FIG. 8. If no decision or determination can be made, for example by processor 190, that the in-vivo device has entered into the target section (shown as "N" at step 240), steps 210, 220, and 230 may be repeated and another decision or determination may be made regarding the transition. If a decision can be made, for example by processor 190, that the in-vivo device has entered into the target section (shown as "Y" at step 240), the decision may be regarded as a temporary or non-final decision that may have to be either validated or invalidated. One way to validate or to invalidate the temporary decision is described below. A decision that the in-vivo device entered the target section may be temporary, for example, if the frames classification process is not sensitive enough and/or the accuracy of the statistical analysis is less than required to make a final/decisive decision. However, if the frames classification is sufficiently sensitive and the statistical analysis is sufficiently accurate, then steps 250, 260 and 270 may not be necessary (these steps may be skipped).

At step 250, another image is captured, for example by in-vivo device 100, and a corresponding frame is transferred, for example to data recorder 160. At step 260, the frame is classified to produce a corresponding frame class, and the resulting frame class is buffered in the class buffer and the updated content of the class buffer is analyzed. At step 270, it is checked again, based on the frame classes' analysis, whether the in-vivo device has entered into the target section. If no decision can be made at this stage, that the in-vivo device has entered into the target section (shown as "N" at step 270), then it is checked, at step 280, whether a maximum time window, Tw_mx, has elapsed since the first time at which a frame was classified. If the maximum time window, Tw_mx, has elapsed (shown as "Y" at step 280), a timeout is determined, at step 282, which means that the process starting at step 210 has to be recommenced. Therefore, another temporary decision may be made again, for example by processor 190, and the temporary decision may be validated or invalidated as described above. If the maximum time window, Tw_mx, has not elapsed yet (shown as "N" at step 280), steps 250, 260, 270, and so on, may be reiterated until a decisive determination is made at step 270 (shown as "Y" at step 270), for example by processor 190, regarding the transition. If the temporary decision regarding transition of the in-vivo device to the target GI section is validated at step 270 (shown as "Y" at step 270); i.e., if the decision reached at step 240 is validated at step 270, a preplanned action/procedure may be performed/executed, at step 272, in response to the decisive transition determination.

Figure 3A:
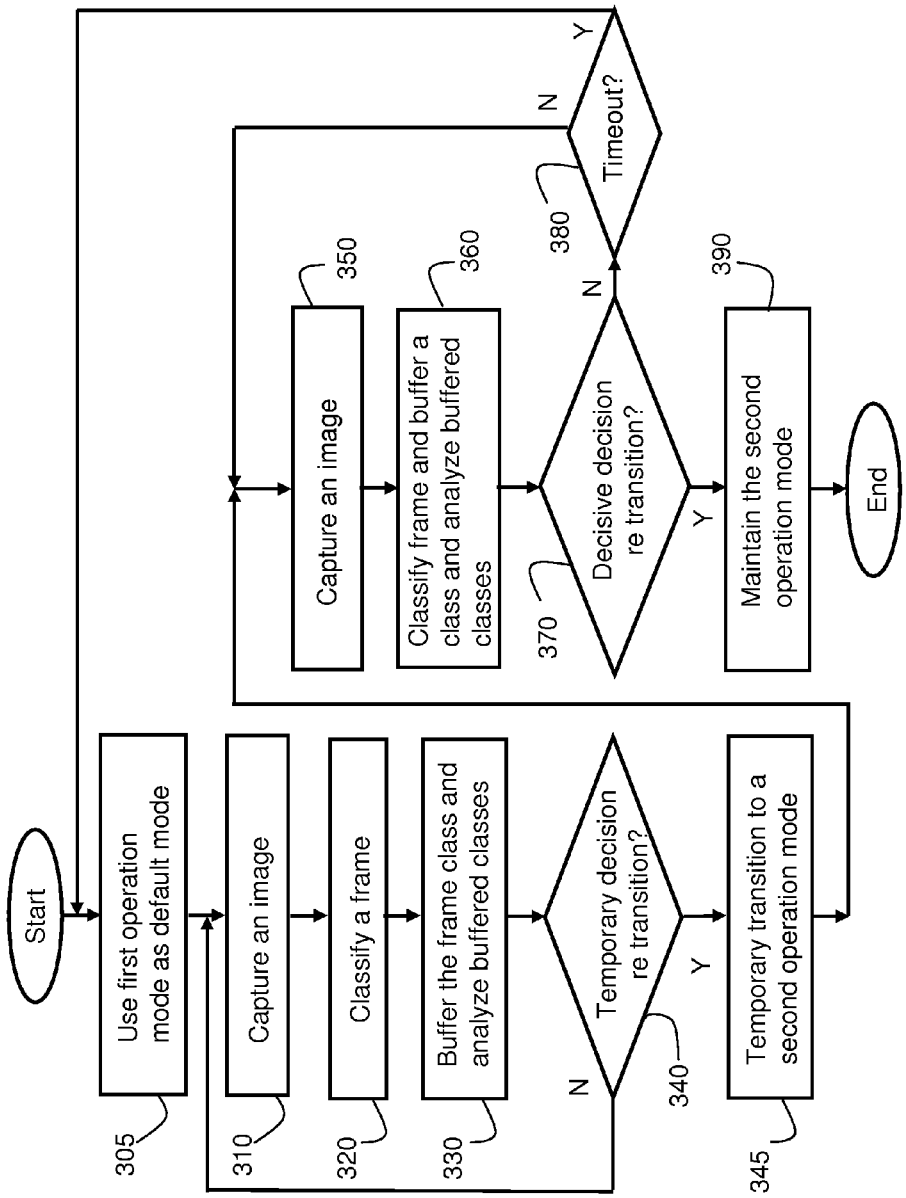
FIG. 3A is a flowchart of a method for changing the operation mode of an in-vivo device by using a temporary decision and a permanent decision according to an embodiment.

FIG. 3A is a flowchart of a method for changing the operation mode of an in-vivo device by using temporary decision and permanent decision according to an embodiment. FIG. 3A will be described in association with FIG. 1. At step 305, in-vivo device 100 is operated in a first operation mode as a default mode. Steps 310, 320, 330, and 340 are, respectively, similar to steps 210, 220, 230, and 240. If it is determined, for example by processor 190, that in-vivo device 100 has transitioned to the target section (show as "Y" at step 340), then, at step 345, an instruction may be sent to in-vivo device 100, for example by processor 190, to transition to a second mode of operation. As in step 240, the decision made at step 340, that the in-vivo device entered into the target section, may be temporary, for example, if the frames classification process is not sensitive enough and/or the accuracy of the statistical analysis is less than required to make a final/decisive decision. However, if the frames classification is sufficiently sensitive and the statistical analysis is sufficiently accurate, then steps 345, 350, 360, and 370 may not be necessary (these steps may be skipped).

As explained above in connection with step 240, a determination made at this stage, regarding transition to the target section, is only temporary. Therefore, the in-vivo device may remain in the second operation mode only temporarily. Steps 350, 360, 370, and 380 are, respectively, similar to steps 250, 260, 270, and 280. If, at step 370, it is determined, for example by processor 190, that the in-vivo device has entered into the target section, then, at step 390, the second operation may be maintained throughout the remaining GI imaging procedure.

If the first operation mode involves capturing images and transferring frames at a first rate, in some embodiments relatively low rate (LFR; e.g., 14 FPM), and the second operation mode involves capturing images and transferring frames at a second rate, in some embodiments relatively high rate (HFR; e.g., 48 FPM), then at step 310 capturing images may done at the first rate, and at step 350 capturing images may done at the second rate. As discussed, more than two rates or modes may be used. If the rate at which image frames are generated by the in-vivo device is too high for real-time operation, the frequency of the frames that are classified may be reduced such that only every $n^{th}$ (where n is an integer) frame in the frame stream generated by the in-vivo device would be used. The first operation mode and the second operation mode may involve using the same image capturing rate, and a difference between them may involve using different statistical criteria during the analysis of the classes.

Figure 3B:
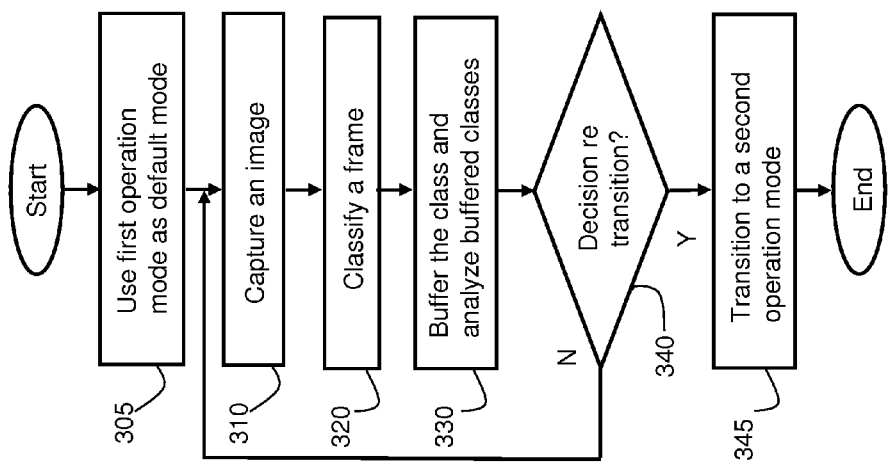
FIG. 3B is a flowchart of a method for changing the operation mode of an in-vivo device by using only a permanent decision according to an embodiment.

FIG. 3B is a flowchart of a method for changing the operation mode of an in-vivo device by using only a permanent decision according to one embodiment. FIG. 3B is identical to FIG. 3A except that in FIG. 3B the decision at step 340 is regarded as a permanent decision and, therefore, the process shown in FIG. 3B is terminated at step 345. In general, using a high image capturing rate obviates the need to make the temporary decision at step 340 of FIG. 3A (and then to validate/invalidate the decision at step 370 of FIG. 3A) because the classes buffer can be filled up quickly and the statistical analysis can commence at an early stage of the GI imaging procedure.

FIG. 4A schematically illustrates an example pixel sampling setup 400 for sampling an image captured by an in-vivo device according to one embodiment. Pixel setup 400 includes multiple triplets of green, blue and red pixels that are arranged as a Bayer filter mosaic. Other arrangements of pixels may be used. An example triplet is shown at 410. In some embodiments, an image signal produced by an imager for a captured image may undergo a process called 'companding' in order to mitigate problems resulting from suboptimal usage of the dynamic range of the imager. However, since frames are checked for validity/eligibility by processing 'regular' (e.g., uncompressed and non-companded) images, each companded image is decompanded prior to it being processed. In some embodiments the frame transferred from in-vivo device 100 to data recorder 160 contains an uncompressed image data. In these embodiments image data need not be decompressed at the receiving end (e.g., data recorder 160), thus facilitating real-time detection of transitions from one GI section to another.

In order to facilitate determination regarding whether an image/frame is eligible for feature extraction, tissue areas are identified in the captured image. Tissue areas may be identified by identifying those pixels, which apparently captured an image of at least part of a tissue area. One way of identifying such pixels is by comparing, for each pixel triplet, the red pixel R to the blue pixel B, and the red pixel R to the green pixel G. In some embodiments, if a ratio R/B is greater than 1.4 (an example reference) and a ratio R/G is greater than 1.1 (an example reference), then the pixel may be regarded as a candidate for use as an indication for a tissue area. If at least one of the ratio R/B and ratio R/G is not greater than the respective reference, the entire pixel triplet may be disqualified for further processing. Other disqualifying conditions may be used. In some embodiments, too bright pixel triplets are disqualified because too bright pixels may indicate saturation of the imager or bubbles in the captured image. A pixel triplet may be regarded as being too bright if the intensity of its red pixel, R, is greater than a predetermined 'brightness' threshold. In some embodiments, the brightness threshold is 245 (in a range of 0-255, if the pixel's intensity is represented by 8 bits and the value 255 designates the highest intensity).

After pixel triplets are filtered out, for example by applying the three criteria mentioned above (e.g., R/B>1.4; R/G>1.1; and R<245), the remaining pixel triplets may be digitally eroded in order to filter out pixel triplets that are not associated with tissue regions. Applying the three criteria may only filter out some of the pixel triplets that are not associated with tissue regions. Therefore, of the remaining (i.e., non-filtered out) pixel triplets, too dark pixel triplets may also be filtered out. By way of example, a pixel triplet may be regarded as too black if the intensity of its red pixel is less than a predetermined 'blackness' threshold. In some embodiments, the blackness threshold is 100 (using the same bits scheme explained above in connection with the brightness criterion).

Imagers typically use a rectangular shaped array of pixels, for example 256×256 pixels, which result in generally rectangle shaped images. The fringe area of rectangle shaped images may be distorted or it may contain artifacts. Therefore, it may be beneficial to remove the fringe area from captured images. One way to remove the fringe area of a captured image is to superimpose a centered circle shaped mask with the captured image, as demonstrated in FIG. 5.

FIG. 4B schematically illustrates the pixel setup 400 of FIG. 4A logically broken into its basic 'R' portion, 'G' portion, and 'B' portion. The R portion (shown at 420) includes all the red pixels of the 256×256 pixel setup 400 of FIG. 4A; the G portion (shown at 430) includes all the green pixels of the 256×256 pixel setup 400 of FIG. 4A; and the B portion (shown at 440) includes all the blue pixels of the 256×256 pixel setup 400 of FIG. 4A. Because the pixel setup 400 has a size of 256×256 pixels, each color portion is a quarter that size: R portion 420 includes 128×128 red pixels; G portion 430 includes 128×128 green pixels; and B portion 440 includes 128×128 blue pixels. Accordingly, D1=128 pixels. (Comment: FIGS. 4A and 4B are not drawn to scale.)

FIG. 5 shows a captured image 500 with a mask 510 according to one embodiment. In one embodiment images may be captured using, for example, a 256×256 pixel array. In some embodiments the size of the R portion, G portion, and the B portion may be 128×128 pixels (D1=128), and the diameter of the mask, D2, may be 112 pixels (D2=112). In other embodiments the mask may have another shape and/or another size. Every pixel triplet whose distance to the center of the circle, 530, is, for example, greater than half the value of D2 (e.g., greater than 112/2=56 pixels) may be filtered out. The pixel triplets remaining after the filtering process; i.e., the pixel triplets regarded as eligible for classification, may be listed in a "tissue list". Then, the number of the pixel triplets in the tissue list may be counted, and if more than a predetermined percentage, in some embodiments 15%, of the pixel triplets in the circle area 520 are valid pixel triplets, the frame corresponding to the processed image may be deemed valid; e.g., eligible for classification. Valid pixel triplets may, then, undergo a feature extraction process as a prerequisite stage to classifying the related frame. If the number of valid pixel triplets that reside in the circle area 520 is less than the prescribed percentage (e.g., 15%), the frame is deemed invalid; i.e., ineligible for classification. A frame that is deemed ineligible for classification may be marked as class '0'. Valid/eligible frames may be numerically marked differently. Frames may be marked using other notations.

In some embodiments, 19 features may be extracted from the listed pixel triplets. In other embodiments other numbers of features and other features may be extracted. Three features may be extracted as follows: the intensity of the red pixel, R(i) (i=1, 2, 3, . . . ,), of each listed pixel triplet Pt(i) may be normalized (r), and a mean value r may be calculated for the whole tissue list based on the normalized red pixels Rs. Likewise, the intensity of the green pixel, G(i) (i=1, 2, 3, . . . ,), of each listed pixel triplet Pt(i) may be normalized (g), and a mean value g may be calculated for the whole tissue list based on the normalized green pixels Gs. Likewise, the intensity of the blue pixel, G(i) (i=1, 2, 3, . . . ,), of each listed pixel triplet Pt(i) may be normalized (b), and a mean value b may be calculated for the whole tissue list based on the normalized green pixels Bs.

For example, for pixel triplet Pt(i), the normalized red pixel for Pt(i), r, may be calculated as shown in formula (1):

$$r = R_i/(R_i + G_i + B_i) \quad (1)$$

where Ri denotes the intensity of the red pixel of the pixel triplet Pt(i); Gi denotes the intensity of the green pixel of the pixel triplet Pt(i); and Bi denotes the intensity of the blue pixel of the pixel triplet Pt(i). The normalized value g and the normalized value b may be calculated in a similar way, by replacing r with g or b, respectively.

The mean value for the normalized red pixels, $\bar{r}$, may be calculated as shown in formula (2):

$$\bar{r} = (r1 + r2 + r3 + , \ldots, + rn)/N \quad (2)$$

where N in formula (2) denotes the number of pixel triplets that are listed in the tissue list. The mean value for the normalized green pixels, $\bar{g}$, and the mean value for the normalized blue pixels, $\bar{b}$, may be calculated in a similar way, by replacing $\bar{r}$ and r1+r2+r3+, . . . , +rn with $\bar{g}$ and g1+g2+g3+, . . . , +gn, respectively, or with $\bar{b}$ and b1+b2+b3+, . . . , +bn, respectively.

Additional six features may be extracted from the covariance matrix of normalized r, g, b, as shown in formula (3):

$$cov(rgb) = \frac{\begin{pmatrix} \sum_{i=1}^{N}[(r_r - \bar{r})^2] & \sum[(r_i - \bar{r})*(g_i - \bar{g})] & \sum[(r_i - \bar{r})*(b_i - \bar{b})] \\ \sum[(r_i - \bar{r})*(g_i - \bar{g})] & \sum[(g_i - \bar{g})^2] & \sum[(g_i - \bar{g})*(b_i - \bar{b})] \\ \sum[(r_i - \bar{r})*(b_i - \bar{b})] & \sum[(g_i - \bar{g})*(b_i - \bar{b})] & \sum[(b_i - \bar{b})^2] \end{pmatrix}}{(N)} \quad (3)$$

where each $\Sigma$ is performed across i, where i is an index running from 1 to the total number, N, of the listed pixel triplets.

Another feature may be a function of the gain, G, and the exposure time, E, the imager sets for each captured image.

The actual gain value and actual exposure time set for each captured image are typically stored in registers associated with the imager. When a frame is produced for a captured image, the registers' content may be transferred to an external apparatus via the frame; e.g., as part of the frame's payload. The feature dependent on the gain value and exposure time may be determined using formula (4):

$$\text{Max}\{|G_n \cdot E_n - G_{n-1} \cdot E_{n-1}|; |G_n \cdot E_n - G_{n+1} \cdot E_{n+1}|\} \quad (4)$$

where $G_n$ and $E_n$ are respectively the gain value and exposure time used to capture a given image, $G_{n-1}$ and $E_{n-1}$ are respectively the gain value and exposure time used to capture an image preceding the given image, and $G_{n+1}$ and $E_{n+1}$ are respectively the gain value and exposure time used to capture an image following the given captured image.

Gain and exposure time are dynamically, and typically internally, adjusted to accommodate for changes in the distance between the in-vivo device's imager(s) and the imaged objects. The gain and exposure parameters are independently adjusted for each imager of the in-vivo device to accommodate for the distance between the imager to the object imaged by the imager. For example, while the in-vivo device is in the stomach, in the case of a multiple-imager devices, one of its imagers may face a relatively close stomach wall that would necessitate a mild gain-exposure adjustment relative to a default setting, while the other/opposite imager may face a more distant stomach wall that would necessitate a robust gain-exposure adjustment relative to the default setting. In general, the greater the difference between the two distances, the greater the difference between the gain-exposure adjustments. Therefore, the gain-exposure dependent feature shown in formula (4), which is useful in particular when the in-vivo device uses two imagers, provides information that can be used to evaluate the depth of an in vivo cavity in which the in-vivo device currently resides, and thus to deduce the type of the associated GI organ/section. If the in-vivo device includes only one imager, the gain-exposure feature demonstrated by formula (4) may not be used. While formulas (1), (2), and (3) refer to features that are extracted per captured image, formula (4) results in a feature that expresses the difference in the gain-exposure settings of the imagers of the in-vivo device.

Additional three features may be obtained by using hue-saturation-value ("HSV") model. Briefly, HSV is a common cylindrical-coordinate representation of points in an RGB color model. HSV is useful for image analysis and computer vision. Since the RGB and HSV coordinate systems are known for handling color information, conversion from one coordinate system to another is not discussed herein. Three features may be calculated for the entire tissue list: one mean value for H, another mean value for S, and another mean value for V. A covariance matrix may be applied to the HSV information to obtain additional six features.

The example nineteen features, according to one embodiment, may be used to classify each frame individually. For example, frames may be classified or sorted as being related to or associated with a GI section or region, or not related to or associated with any particular GI section or region. A frame may be classified as not related to any particular GI section or region, or as being unknown or unclassifiable, if the classification process fails to discern the related GI region or section from the related image, for example because the image is corrupted or of low quality (or fails to discern the related region with a certain amount of certainty). In one embodiment a frame may be classified as related to or associated with the stomach or to the small bowel. In other embodiments frames may be classified as related to other or additional GI sections. Each frame that is related to the stomach may be marked as 'class 1', and each frame that is related to the small bowel may be marked as 'class 2'. The functionality of the frame type classifier may be improved by using also a "reject" class that would be applicable in cases where frames are close to a decision boundary/limit but cannot be classified as related to a GI section, be it the small bowel or the stomach or another GI section. A rejected frame may be marked as 'class 3'. Class '3' may improve the probability that a frame that is classified as related to the stomach or to the small bowel is rightfully classified as such. In other words, not using a rejected class (e.g., class 3) may increase the probability of a frame being unjustifiably classified as related to the stomach or to the small bowel. If the gain-exposure feature (see formula (4)) is used, evaluation of a current frame (e.g., frame$_n$) can be completed after the next frame (e.g., frame$_{n+1}$) is processed. However, the gain-exposure feature may be used in a different way, or be ignored altogether.

The classifier used to classify the frames based on the frame marks may be, in one embodiment, a logistic linear classifier ("LOGLC") that may be based on a logistic function as shown in formula (5):

$$Y(t) = \frac{1}{1 + e^{-t}} \quad (5)$$

Adopting the simple logistic formula (5), the logistic linear classifier (LOGLC) may be defined as shown in formula (6):

$$LogLinear = \frac{1}{1 + e^{-\sum_{i=1}^{19} a_i \cdot x_i}} \quad (6)$$

where i=1, 2, . . . , 19 is an index of the features, $x_i$ is one of the 19 features, and $a_i$ is a coefficient of $x_i$. The value of each coefficient, which is found by using a training mechanism, may be positive or negative, and the value of $x_i$ for each i is positive. Therefore, the value of the classifier (i.e., the value of Loglinear) can theoretically be within the range 0 to 1.

The classification may be done by using a classification formula such as classification formula (7), which, by way of example, includes three entries—the first entry being related to the stomach, the second entry being related to the small bowel, and the third entry being related to a rejected frame:

$$\text{Classification} = \text{Max\_of} \begin{pmatrix} -0.7 \cdot (1 - LogLinear) \\ -0.5 \cdot LogLinear \\ -0.1(constant) \end{pmatrix} \quad (7)$$

where "−0.7×(1−LogLinear)" is associated with class '1' that denotes the stomach; "−0.5×LogLinear" is associated with class '2' that denotes the small bowel; and "−0.1" is associated with class '3' that denotes a rejected frame.

The values '0.7', '0.5' and '0.1' are values of a 'cost' matrix that was input to the training machine, where '0' denotes no cost for true stomach, or no cost for true small bowel; '0.1' denotes low cost for saying that a frame is rejected; '0.5' denotes medium/fair cost for saying that a frame is related to the stomach while, in reality, it is related to the small bowel;

and '0.7' denotes high cost for saying that a frame is related to the small bowel while, in reality, it is related to the stomach.

For example, assume that a valid frame is processed and the features described above are extracted from the pertinent image. Also assume that, using formula (6), LogLinear=0.025. Then, applying classification formula (7) would result in three values:

1. $-0.7 \times (1 - 0.025) = -0.6825$
2. $-0.5 \times 0.025 = -0.0125$
3. $-0.1$ Since the class of a frame is embodied in the maximum value in formula (7), and in this example the value of the second formula entry (−0.0125) is the largest (i.e., less negative), this means that the related frame is to be associated with the small bowel. Accordingly, the frame would have been marked as 'class 2', the class representing, in this example, the small bowel.

Classifying a particular frame may be based on any one of: a feature derived from imaging parameters, for example gain and exposure time, pertaining to the particular frame; imaging parameters pertaining to a classified frame preceding the particular frame; and imaging parameters pertaining to a classified frame following the particular frame; and features derived from, or based on manipulation of, color information pertaining to the pertinent image.

Figure 6:
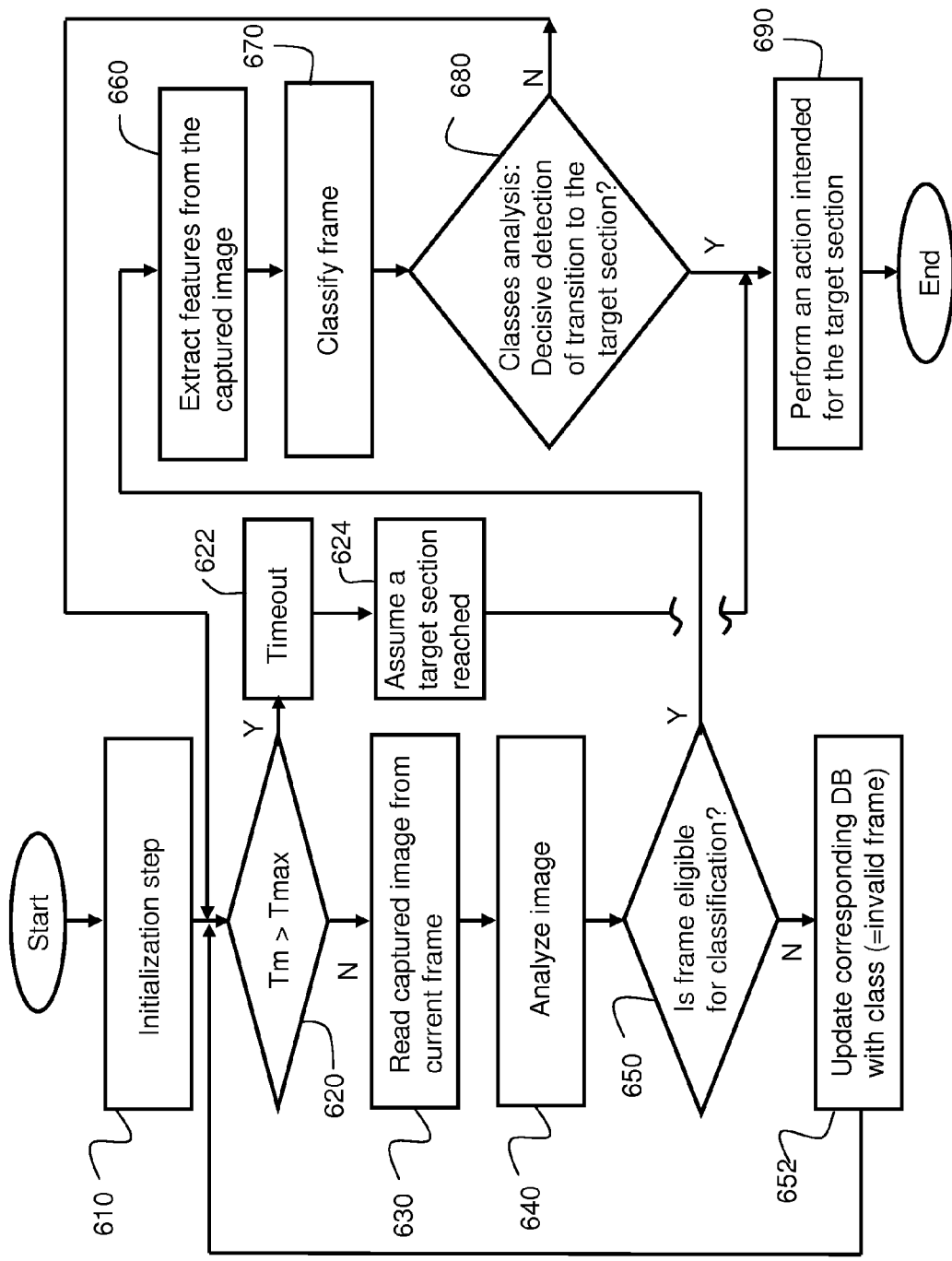
FIG. 6 is a flowchart of a method for determining transition of an in-vivo device from one GI section to an adjacent GI section according to an embodiment.

FIG. 6 is a flowchart of a method for determining transition of an in-vivo device from one GI section to an adjacent GI section according to one embodiment. One embodiment the transition may be from the stomach to the small bowel. Other embodiments may include transitions between other sections of the GI system. The embodiment described in FIG. 6 refers to one in-vivo imager but the method is likewise applicable to in-vivo devices that contain two or more imagers. In general, the methodologies disclosed herein are applicable to any series of images (and to subsequent series of frames) jointly captured by imagers of an in-vivo device.

Step 610 is an initialization phase. The initialization phase may include initially operating the in-vivo device in a first mode in which the in-vivo device may capture images and transfer a corresponding stream of frames at a first rate. In one embodiment the first rate may be, for example, a relatively low rate (LFR). The rate at which the in-vivo device transfers a stream of frames may be identical to or different from the image capturing rate. For example, the image capturing rate may be faster than the frame transfer rate. Regardless of the used frames transfer rate, frames may be classified on a selective basis, for example every $n^{th}$ (where n is an integer) frame in a stream of frames may be classified while other frames may be ignored. Any subset of image frames may be selected for classification. The selection of frames, or subset of frames, for classification may be contingent on the rate at which the in-vivo device captures images or transfers the stream of frames. In another example, frames may be selected for classification per fixed time interval (e.g., every 30 seconds), per changing time interval (e.g., at the beginning every 5 minutes, then after 1 minute, etc.), or according to the image contained in the frame. For example, an image and/or data related to the image may be pre-processed, and a determination regarding whether to classify the pertinent frame or not may depend on the pre-processing result. In one embodiment, the low frame rate (LFR) may be, for example, 14 frames per minute ("FPM"). Other LFRs may be used, for example less frequent than 14 FPM (e.g., 8 FPM) or more frequent than 14 FPM (e.g., 18 FPM).

The in-vivo device's image capturing rate may be initialized to the LFR, for example, because (in one set of applications) the esophagus and the stomach, which are the GI system's sections/organs traversed first by the in-vivo device, are relatively less clinically interesting sections/organs. If it is desired to take a better look, for example, at the small bowel, a higher image capturing rate, and, consequently, higher frame transmission rate may have to be used. One way of determining if or when the in-vivo device is to be operated in a second operation mode, in which it captures images at a second image capturing rate, in some embodiments a higher image capturing rate, is shown, for example, in FIG. 6 and in FIG. 7, which are described below. As part of the initialization process, a master timer, Tm, may be reset. The master timer is a timer that counts or measures time until timeout is reached. Timeout is reached if no determination can be made, regarding transition of the in-vivo device, during a predetermined time period that is counted or measured by the master timer.

Regarding Tm, it may occur that, for various reasons, no decisive decision can be made during a predetermined time period, regarding whether or not the in-vivo device has transitioned from a specific GI section to an adjacent GI section. In such cases, it may be beneficial to assume, following that time period, that it has transitioned to the adjacent GI section, and, accordingly, to operate the in-vivo device in the second mode. In some embodiments the predetermined time period may be 4 hours; other time periods may be used, for example 6 hours.

Step 610 may also include initialization of two databases: one database which is related to the first image capturing rate, and another database which is related to the second image capturing rate. Relating a particular database to a particular image capturing rate generally means that the particular database is updated with classes of frames that are transferred from the in-vivo device at that particular rate (e.g., LFR or HFR). Nevertheless, some classes of frames that are transferred at the second rate (HFR), and therefore are buffered in the database reserved for such classes, may be buffered in the other database as well, the reason for this being explained below, for example, in connection with step 828 of FIG. 8. Initialization of a database includes erasing its content.

At step 620, the value of the Tm is checked to determine whether the predetermined time, Tmax, which may be measured from the time at which the in-vivo device was swallowed, or after some delay (e.g., 3 minutes), has elapsed since swallowing of the in-vivo device. If it is determined that the predetermined time, Tmax, has elapsed without the in-vivo system being able to determine transition from a particular GI section to an adjacent GI section (shown as "Y" at step 620), a timeout is reached, at step 622. A timeout may result in a determination, at step 624, that the in-vivo device is in the GI section adjacent to the particular GI section; e.g., in a target GI section, and, consequently, in a determination to perform an action, at step 690, that is intended, scheduled or planned for the in-vivo device while it resides in the target section. For example, the action may be, or include, increasing the image capturing rate (and, accordingly, the frame transmission rate), releasing a medication, etc. Alternatively, after a timeout is reached at step 622, step 624 may be ignored and a procedure currently executed may be terminated, or an intended procedure may not be executed, or a frame may be classified or marked manually, for example by a physician.

If it is determined that the predetermined time, Tmax, has not elapsed yet (shown as "N" at step 620), an image is read (e.g., extracted) form the current frame, at step 630, and analyzed, at step 640, in order to determine the frame's validity; that is, to determine whether the frame is eligible for classification. A frame may be deemed ineligible for classification if the related (e.g., contained) image is corrupted to the extent that no useful features can be extracted from it. For example, a frame containing an image that is generally too bright or generally too dark or too corrupted due to poor transmission quality may be regarded as invalid or ineligible for classification. If it is determined that the frame is ineligible for classification (shown as "N" at step 650), the frame is classified as an invalid frame and the 'invalid' class is added, at step 652, to the database corresponding to the first image capturing rate because the pertinent frame was transferred using the first rate. Then, the steps 620, 630, 640 and 650 may be repeated for as long as step 620 is not subjected to timeout (i.e., Tm≤Tmax). If it is determined that the frame is eligible for classification (shown as "Y" at step 650), features may be extracted from the image, at step 660, for example by using a features extraction module such as FFE 180, based on which the frame may be classified, at step 670. By "classified" in one embodiment is meant associated with (e.g., showing an image of or representing, or determined to be captured within) a presumed GI section. If a frame cannot be associated with any classable section of the GI system, it may be classified, for example, as a rejected frame. One way of using the classes is shown, for example, in FIG. 8, which is described below.

At step 680, the class of the frame is buffered in the corresponding database, and a transition of the in-vivo device from a particular GI section to the adjacent GI section (e.g., to the target section) is determined based on the statistical analysis of the classes of the current frame and past frames, which are buffered in the databases. It is noted that in some embodiments one database may be used instead of two databases, and its content, as well as the content of the two databases, if used, may be analyzed by using a different statistics and/or set of criteria. If a decisive determination is made, regarding transition from the particular GI section to the target section (i.e., the GI section adjacent to the particular GI section), (shown as "Y" at step 680), an action intended, scheduled or planned for the in-vivo device while it resides in the target section may be performed, at step 690. A decisive determination that a condition is satisfied may be made if it can be shown that the condition is satisfied with high probability. However, if no decisive determination can be made regarding transition of the in-vivo device to the target GI section (shown as "N" at step 680), a temporary decision may, or may not, be made to perform the intended/planned action In addition, the process starting from step 620 may be repeated. One way to implement step 680, is shown in FIG. 7, which is described below.

Figure 7:
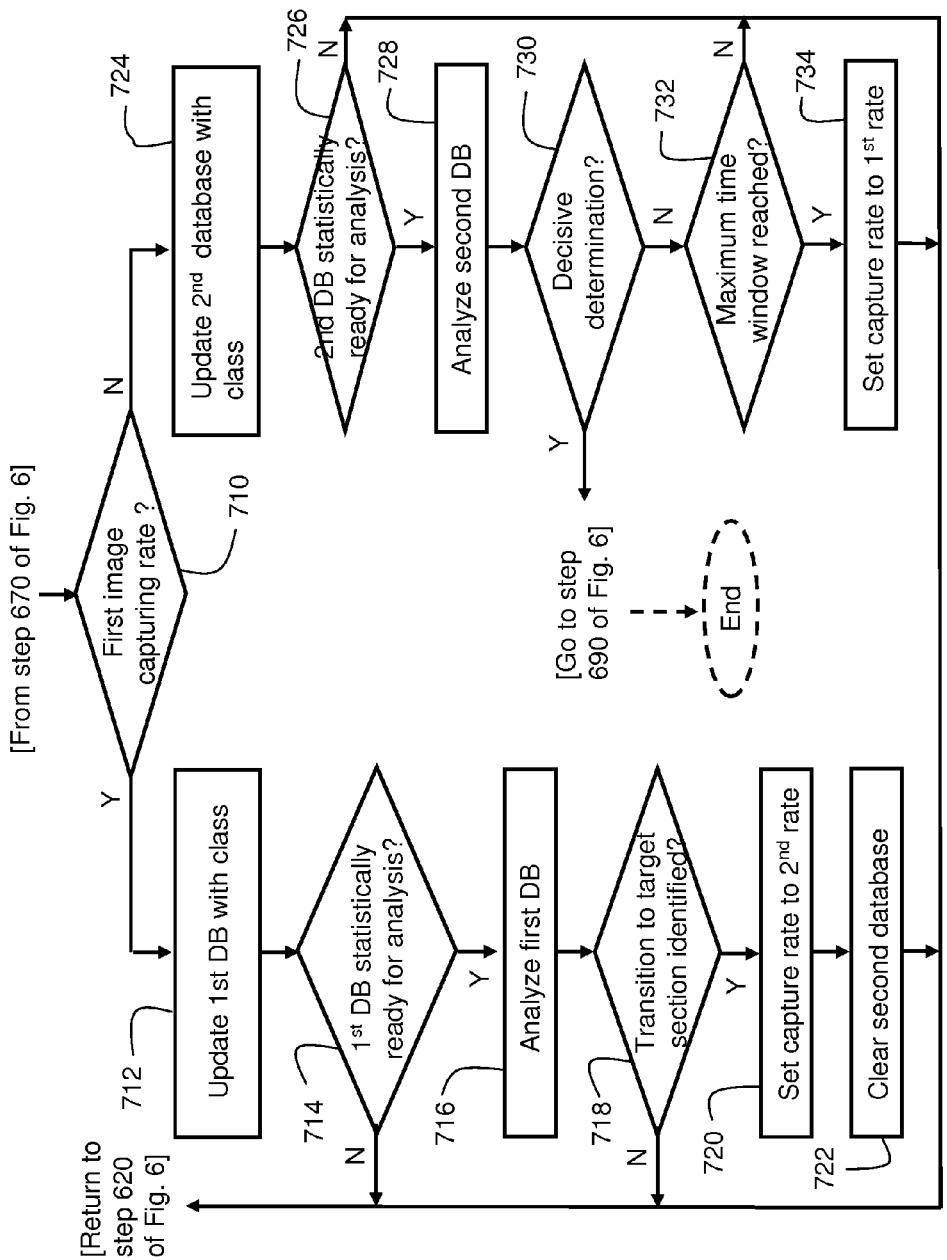
FIG. 7 is a flowchart of a method for determining transition of an in-vivo device from one GI section to an adjacent GI section according to another embodiment.

FIG. 7 is a flowchart of a method for determining transition of an in-vivo device from one GI section to an adjacent GI section according to another embodiment. FIG. 7 will be described in association with FIG. 1. The embodiment shows in FIG. 7 may refer to one in-vivo imager but, as explained above, the method is also applicable to in-vivo devices that contain two imagers or more. At step 680 of FIG. 6 it may occur that, due to indecisive determination regarding transition from a specific GI section to a target section, a frame is erroneously classified, for example by processor 190, as showing, representing or related, to a wrong GI section (e.g., to the small bowel rather than the stomach), and, as a result of this, the intended/planned action (e.g., temporarily changing the image capturing rate, and, consequently, the frame transmission rate to a higher rate (HFR)). Therefore, at step 710, it is checked, for example by processor 190, whether in-vivo device 100 currently operates in a certain mode, e.g., the low frame rate (LFR) mode or in the high frame rate (HFR) mode. If in-vivo device 100 currently operates in the low frame rate (LFR) mode (shown as "Y" at step 710), the database which is updated with the class is the first database (e.g., LFR_DB 184), as shown at step 712. However, if in-vivo device 100 currently operates in the high frame rate (HFR) mode (shown as "N" at step 710), the database which is updated with the class is the second database (e.g., HFR_DB 186), as shown at step 724. Other modes may be used.

Assume that in-vivo device 100 starts operating in the LFR mode as a default (other starting modes may be used). At step 712, the class of the frame that is processed last (e.g., the current output of FTC 182) is added to a new/empty entry in the first database (e.g., LFR_DB 184), at step 712. At step 714, it is checked, for example by processor 190, whether the current number of frame classes buffered in the first database is greater than a number of classes, $N_{LFR}$, that is sufficient for statistical analysis. $N_{LFR}$ may be contingent on, determined by, or derived from, a passage time, $T_{LFR}$, of the in-vivo device in the GI system. For example, assuming a frame transfer rate of, say, 14 FPM, and $T_{LFR}$=8 minutes, $N_{LFR}$ would equal to 8×14=112 classes. $T_{LFR}$ may be deduced through training of the imaging system by using training frames/images and based on the features described herein. Using other training frames/images and/or other or additional features may change the value of $T_{LFR}$.

If the number of classes that are currently buffered in the first database is less than $N_{LFR}$ (shown as "N" at step 714 of FIG. 7 and step 680 of FIG. 6), this may mean that the first database is not ready for statistical analysis. Therefore, the number of frame classes buffered in the first database is increased, for example by one class; e.g., additional new frame's class(es) may be added to the database at step 712. Then, the content of the first database, with the new frame class(es) added to it, may be reevaluated at step 714. If the number of frame classes that are currently buffered in the first database is equal to $N_{LFR}$ (shown as "Y" at step 714), the frame classes buffered in the first database are statistically analyzed, at step 716, in order to determine whether the in-vivo device has transitioned to the target GI section.

At step 718 it is checked, based on the analysis of the frame classes buffered in the first database, whether the in-vivo device has transitioned from the particular GI section to the target GI section. If it is determined, for example by processor 190, that the in-vivo device has not transitioned to the target GI section yet (shown as "N" at step 718), the first database may be updated with new frame class(es) for further processing/evaluation. While updating of the first database with new frame classes may continue every time the conditions checked at steps 714 and step 718 are not met (shown as "N" at each of these steps), only a failure to meet the condition of step 714 results in an increase in the number of the classes contained in the first database; e.g., until their number equals to $N_{LFR}$. If the condition of step 718 is not satisfied, the oldest class in the first database is substituted by the newest class in order not to exceed $N_{LFR}$ classes. In other embodiments the number of classes in the first database may continue to increase with each database update or once every n (n=2, 3, . . . ,) such updates. If it is determined, for example by processor 190, that the in-vivo device has transitioned to the target GI section yet (shown as "Y" at step 718), the image capturing rate of in-vivo device 100 may be increased, at step 720, to a second rate. At step 722, the second database (the database associated with the second image capturing rate) may be cleared if it contains frame classes.

In order to facilitate real-time determination of the in-vivo device transitioning to the target section, the maximum number of classes, $N_{LFR}$, that the first database may be allowed to contain may be relatively small (e.g., a few hundreds of classes), and the determination criteria used at step 718 may be relatively lenient. Given these factors (small $N_{LFR}$ and lenient determination criteria), the determination that in-vivo device 100 transitioned to the target GI section, may be indecisive and, therefore, temporary. One way to obtain a decisive determination is described below. A decisive determination may be made using other ways.

Referring again to step 720, an instruction may be transferred to in-vivo device 100 (e.g., to controller 130), for example by processor 190, to capture images and transfer frames at the second rate (e.g., HFR). As explained above, the determination that in-vivo device 100 transitioned to the target GI section may be temporary. If a temporary determination is made with respect to the transition of the in-vivo device, it may be determined, for example by processor 190, that the first image capturing rate be resumed until a decisive determination is made.

Assume that the next frames are transferred to data recorder 160 at the second rate. Also assume that a first such frame (a 'HFR' frame) is classified at step 670 of FIG. 6 and the second database, which is associated with the second rate, is updated, at step 724, with the class of the HFR frame. At step 726, it is checked, for example by processor 190, whether the current number of frame classes that are buffered in the second database is sufficient for statistical analysis. It may be predetermined that the minimum number of classes that are sufficient for statistical analysis is $N_{HFR\_min}$. For example $N_{HFR\_min}=250$ classes. $N_{HFR\_min}$ may be contingent on, determined by, or derived from, the passage time, $T_{HFR\_min}$, of the in-vivo device in the GI system. For example, assuming a frame transfer rate of, say, 48 FPM, and $T_{HFR\_min}=6$ minutes, $N_{HFR\_min}$ would equal to 6×48=288 classes. $T_{HFR\_min}$ may be deduced through training of the imaging system by using training frames/images and based on the features described herein. Using other training frames/images and/or other or additional features may change the value of $T_{HFR\_min}$.

If the number of frame classes that are currently buffered in the second database is smaller than $N_{HFR\_min}$ (shown as "N" at step 726), the number of frame classes buffered in the second database may be increased, for example by one; e.g., an additional new frame's class may be added to the second database at step 724. Then, the second database, with the new frame class(es) added to it, is reevaluated statistically, at step 726, for example by processor 190. If the number of frame classes that are currently buffered in the second database is at least $N_{HFR\_min}$ (shown as "Y" at step 726), the frame classes buffered in the second database are statistically analyzed, at step 728, in order to determine whether the in-vivo device has transitioned to the target GI section.

At step 730 it is checked, for example by processor 190, based on the analysis of the at least $N_{HFR\_min}$ classes that are buffered in the second database, whether the in-vivo device has transitioned from the particular GI section to the target GI section. If it is determined, for example by processor 190, that the in-vivo device has transitioned to the target GI section (shown as "Y" at step 730), an action may be taken, which is intended/planned for in-vivo device 100 while it resides in the target GI section. For example, the intention or plan may be to cause in-vivo device 100 to permanently use the second rate, to administer a medication, etc. However, if it is determined, for example by processor 190, that the in-vivo device has not transitioned to the target GI section yet (shown as "N" at step 730), it is further checked, at step 732, whether a maximum analysis time window, $T_{HFR\_MAX}$, has elapsed, for example, from the time at which the second database was updated with the first class. A maximum number of classes, $N_{HFR\_MAX}$, may be derived from $T_{HFR\_MAX}$ and from the rate at which the in-vivo device transfers frames to the external system.

If it is determined, for example by processor 190, that the maximum analysis time, $T_{HFR\_MAX}$, has not elapsed yet (shown as "N" at step 732), a new frame is analyzed and classified as per FIG. 6, and the second database is updated with the new frame class at step 724. Then, steps 726, 728, and 730 are repeated, now with the second database including one more frame class. However, if it is determined, for example by processor 190, that the maximum analysis time, $T_{HFR\_MAX}$, has elapsed (shown as "Y" at step 732), this means that no decisive determination could be made at step 730 regarding transition of the in-vivo device to the target GI section. This strengthens the conclusion that the decision made at step 718, to temporarily transition the in-vivo device to the second image capturing rate (at step 720) was wrong. Therefore, at step 734, the in-vivo device is transitioned back to the first image capturing rate, for example by processor 190. Then, the process starting at step 620 of FIG. 6 (e.g., filling the first database, analyzing the frame classes buffered in the first database, and so on), and continues at step 710 of FIG. 7 etc., may be repeated.

Updating the second database with new frame classes may continue every time any of the conditions checked at step 726 and step 732 is not met (shown as "N" at each of these steps), and each update results in an increase in the number of the classes contained in the second database. The number of the classes that are contained in the second database may be increased up to a maximum number that may depend on the maximum analysis time, $T_{HFR\_MAX}$, that is permitted to elapse before timeout is reached. The maximum analysis time, $T_{HFR\_MAX}$ may be chosen such that the statistical data utilized at step 730 (i.e., the maximum number of classes in the database) facilitates a decisive determination regarding transition of the in-vivo device to the target GI section.

Figure 8:
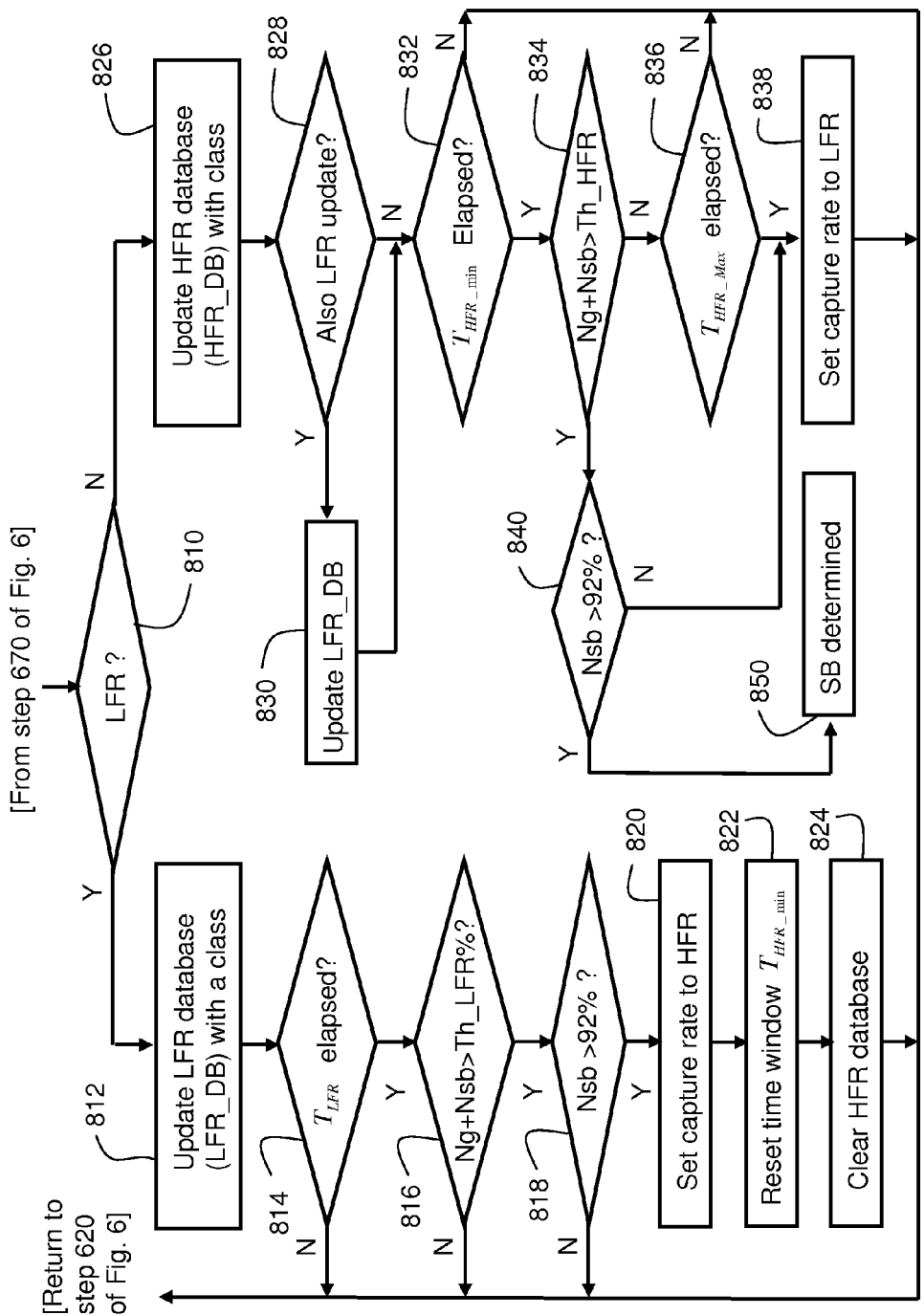
FIG. 8 shows a flowchart of a method for determining transitioning of an in-vivo device from the stomach to the small bowel according to an embodiment of the invention.

FIG. 8 shows a flowchart of a method for determining transitioning of an in-vivo device from the stomach, an example GI section, to the small bowel, an example adjacent/target GI section, according to an embodiment. Steps 810 and 812 are respectively corresponding to steps 710 and 712 of FIG. 6. Assume that the in-vivo device initially captures images and transfer frames at the low rate (i.e., LFR rate), and may transition from the LFR rate to the HFR rate, and vice versa, based on frame classes that are buffered in LFR_DB 184, which is associated with the LFR rate, and/or in HFR_DB 186, which is associated with the HFR rate.

At step 814, it is checked, for example by processor 190 (e.g., by using timer 172), whether a predetermined LFR time window, $T_{LFR}$, has elapsed. A LFR time window of sufficient width, in some embodiments $T_{LFR}=8$ minutes, may be used to ensure that a statistically sufficient number of frame classes are buffered in LFR_DB 184. In one embodiment the duration of $T_{LFR}$ may be fixed. In other embodiments $T_{LFR}$ may be increased to enhance the transition determination process as a whole. If the predetermined LFR time window, $T_{LFR}$, has not elapsed (shown as "N" at step 814), the next captured image is processed in the same way and step 810 is checked again. Since the image capturing rate has not changed yet to the HFR rate (the in-vivo device is still using the LFR rate), the class of the pertinent frame is added to LFR_DB 184 at step 812. The latter process is repeated until the LFR time window, $T_{LFR}$, elapses, after which LFR_DB 184 may be regarded as ready for statistical analysis (see also step 714 of FIG. 7). Filling LFR_DB 184 with frame classes during the LFR time window, $T_{LFR}$, is one criterion that is checked before a decision to temporarily use the higher image capturing rate (HFR) is made, for example by processor 190. Additional criteria may be used to enhance that decision, as explained below.

When the LFR time window, $T_{LFR}$, elapses (shown as "Y" at step 814), it is checked (e.g., by processor 190), at step 816, whether the total number of frame classes buffered in LFR_DB 184 that represent the stomach and/or the small bowel, compared to all the frame classes buffered in LFR_DB 184, is greater than a predetermined threshold, Th_LFR %. In some embodiments Th_LFR %=30%. In other embodiments Th_LFR % may differ from 30%; e.g., it may be 23%, 35%, etc. The cumulative number of frame classes in LFR_DB 184 that represent the stomach is designated as "Ng" at step 816, and the cumulative number of frame classes in LFR_DB 184 that represent the small bowel is designated as "Nsb" at step 816. If less than Th_LFR % of the frame classes buffered in LFR_DB 184 represent the stomach and/or the small bowel (shown as "N" at step 816), an additional frame is processed/analyzed; its class is added to LFR_DB 184; and step 816 is checked again. Since database LFR_DB 184 is continuously updated with new classes as the in-vivo device traverses the GI system, it is expected that, some time, Ng, or Nsb or Ng+Nsb would exceed the specified threshold Th_LFR %.

At step 818, it is checked whether [Nsb/(Nsb+Ng)]×100%>Th_SB %, where Th_SB % is a threshold value. In some embodiments Th_SB=92%; other percentage thresholds may be used (e.g., 90%). Assume that Th_SB=92%. If [Nsb/(Nsb+Ng)]×100≤92% (shown as "N" at step 818), steps 810, 812, 814, and 816 may be repeated until the condition of step 818 is satisfied. However, if [Nsb/(Nsb+Ng)]×100>92% (shown as "Y" at step 818), and also having the prerequisite conditions at steps 814 and 816 satisfied, this may indicate, for example to processor 190, that in-vivo device 100 has entered the small bowel. Therefore, at step 820 the image capturing rate (and the consequent frame transmission rate) may be increased (to the HFR), and processor 190 may transfer an instruction to controller 130 to that effect.

Each decision to increase the image capturing rate (see step 820) is made, for example by processor 190, based on the frame classes buffered, in some embodiments, in LFR_DB 184. After a decision is made at step 820 to increase the image capturing rate, a HFR minimum time window $T_{HFR\_min}$ is reset at step 822, and the content of HFR_DB 186 is cleared at step 824, for example by processor 190, in preparation for the analysis of frame classes that would be buffered in the HFR database. A HFR time window $T_{HFR\_min}$ of sufficient width may be used to ensure that a statistically sufficient number of classes are buffered in HFR_DB 186.

Assume that, at step 820, in-vivo device 100 receives an instruction, for example from processor 190, to use the higher image capturing rate, HFR. The next frame in-vivo device 100 transfers to data recorder 160 (by using the higher frame transfer rate) is processed in the way described in connection with FIG. 6, except that when step 670 is performed again, it is performed with the image capturing rate set to the higher rate (HFR). Referring again to step 810, it is checked whether the image capturing rate is LFR or HFR. As explained above in connection with step 820, at this point of the process in-vivo device 100 captures images and transfers corresponding frames at the higher rate (HFR). Therefore, the next step to be performed is step 826, in which HFR_DB 186 is updated with the class related to the pertinent frame.

At step 828 it is checked, for example by processor 190, whether LFR_DB 184 has to be updated as well. LFR_DB 184 may be occasionally updated even though the currently used image capturing rate is HFR, because it may be determined later that the lower image capturing rate (LFR) is to be resumed. If such a determination is made, it would be beneficial to have some past classes already stored in LFR_DB 184 rather than having to refill LFR_DB 184 from zero. Starting to fill LFR_DB 184 from zero when the image capturing rate changes from the high rate to the low rate may result in a delay in the determination to transition again from the low image capturing rate to the high image capturing rate (at step 820). If LFR_DB 184 does not need to be updated with a particular class (shown as "N" at step 828), LFR_DB 184 is not updated and, at step 832, it is checked whether a minimum HFR time window, $T_{HFR\_min}$, elapsed. (Comment: $T_{HFR\_min}$ is measured from the time at which a first class is added to an empty HFR_DB 186.) If LFR_DB 184 needs to be updated as well (shown as "Y" at step 828), LFR_DB 184 is updated and, concurrently or thereafter, step 832 is performed. If the predetermined time window, $T_{HFR\_min}$, has not elapsed yet (shown as "N" at step 832), a new frame is processed and steps 810, 826, 828, 830, and 832 are repeated.

Assume that $T_{HFR\_min}$=6 minutes; other minimum HFR time windows may be used. If six minutes (an example minimum HFR time window, $T_{HFR\_min}$) elapsed (shown as "Y" at step 832), the frame classes buffered in HFR_DB 186 are deemed to be statistically analyzable. The analysis of these classes may start by checking, at step 834, whether the number of classes in HFR_DB 186 that represent the stomach and/or the small bowel exceeds a predetermined threshold, Th_HFR. In some embodiments Th_HFR=172, which corresponds to high frames transfer rate (HFR) of 48 FPM: assuming a requirement that at least 60% of all the classes represent the stomach or the small bowel, the number of the related frames may be equal to 6 min·($T_{HFR\_min}$)*48 (FPM)*0.60≅172 frames of stomach and/or SB. The other classes stored in the HFR database during this period ($T_{HFR\_min}$) may represent invalid frames or rejected frames, or they may represent the stomach or SB. In other embodiments other thresholds may be used (e.g., Th_HFR=180). If less than 172 frames, according to one embodiment, are related to the stomach and/or to the small bowel (shown as "N" at step 834), it is checked, at step 836, whether a predetermined maximum HFR time window, $T_{HFR\_Max}$, has elapsed. In one embodiment, $T_{HFR\_Max}$ may be measured from the time at which the first class is added to HFR_DB 186. In some embodiments $T_{HFR\_Max}$ may equal to 12 minutes; other maximum HFR time windows may be used.)

If the elapsed time does not exceed the specified time window $T_{HFR\_Max}$ (shown as "N" at step 836), a new frame is processed and steps 810, 826, 828, 830 (an optional step), 832, 834, and 836 are repeated. However, if the specified time window $T_{HFR\_Max}$ has elapsed (shown as "Y" at step 836), this, and having the prerequisite conditions specified at steps 832, 834, and 836, met, means that no decisive determination can be made, regarding transition of in-vivo device 100 from the stomach to the small bowel. Therefore, at step 838, the LFR mode may be reinstated; e.g., the low image capturing rate and the low frames transferring rate may be reused. Processor 109 may transfer an instruction to controller 130 to that effect.

At step 840, it is checked whether the percentage of the classes representing the small bowel, Nsb, is greater than Th_SB % of the sum Ng+Nsb. In some embodiments Th_SB=92%; other percentage thresholds may be used (e.g., 90%). Assume that Th_SB=92%. If less than 92% of the classes representing the stomach and/or the small bowel represent the small bowel (shown as "N" at step 840), this means that no decisive determination can be made regarding transition of in-vivo device 100 from the stomach to the small bowel. Therefore, at step 838, the image capturing rate may be changed to LFR. However, if at least 92% (other percentage thresholds or levels may be used) of these frames represent the small bowel (shown as "Y" at step 840), this means that it is highly probable that in-vivo device 100 is currently in the small bowel. Therefore, a final/decisive determination may be reached, at step 850, that that in-vivo device 100 is currently in the small bowel. As a result of the final/decisive determination that the in-vivo device is in the target GI section (in this example in the small), the high image capturing rate and high frames transferring rate may be used until the end of the GI imaging procedure.

Figure 9:
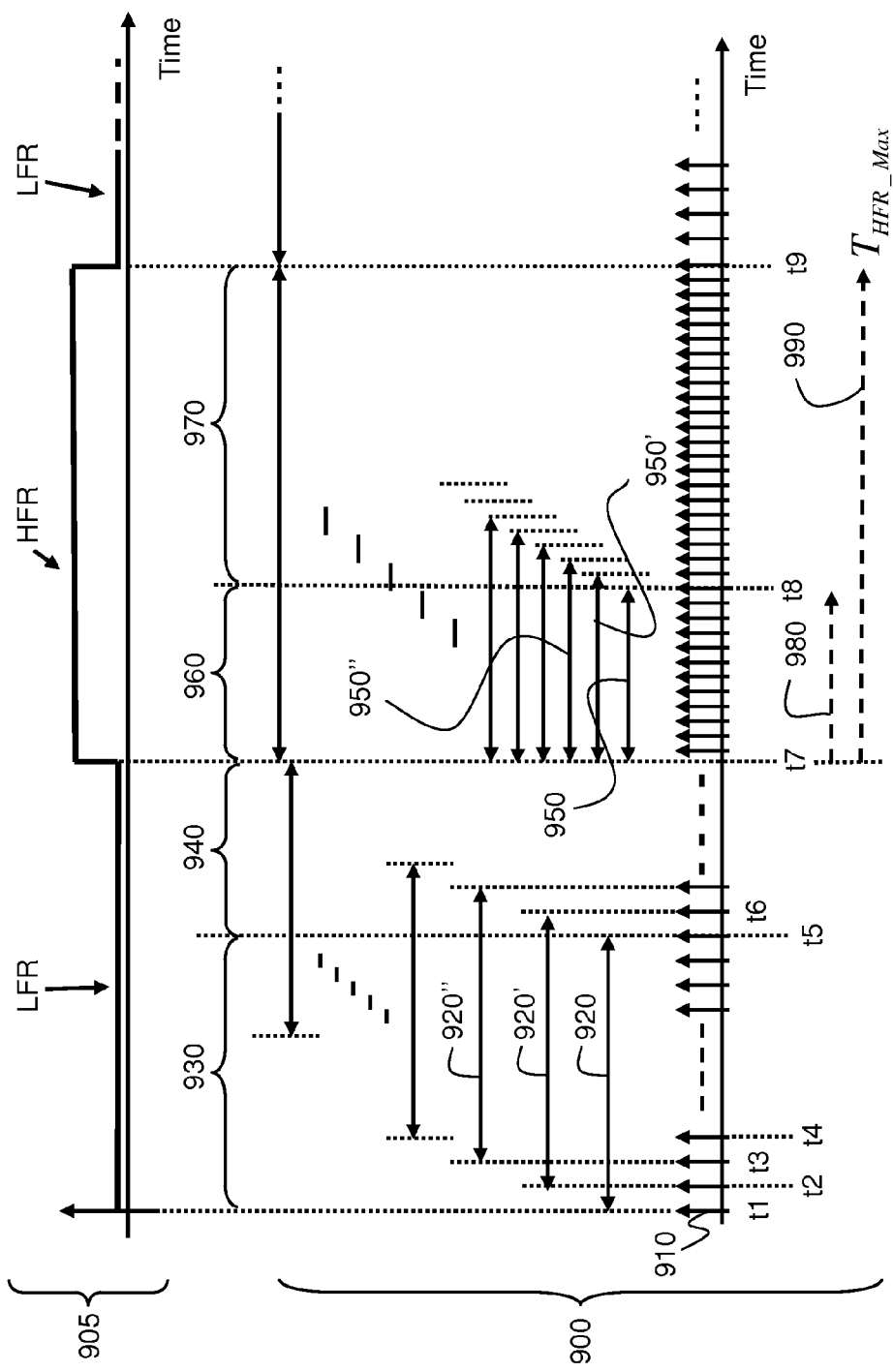
FIG. 9 shows an example time diagram for a case where timeout is reached according to an embodiment of the invention.

FIG. 9 shows an example time diagram 900 for a case where timeout is reached. At the time t1, at which the in-vivo device is swallowed or a short time after its swallow, the in-vivo device operates in the LFR mode, in which it captures images and transfers frames at the LFR rate. Each of the up-pointing arrows along the time axis designates a frame reception time. For example, the arrow shown at 910 designates a frame that is received at time t1.

Beginning at time t1, frames are received, for example at data recorder 160, at the low rate (LFR). At time t1, one frame is processed and analyzed in order to determine its class, and the determined class is added, for example, to LFR_DB 184. As explained above, LFR_DB 184 is not ready for statistical analysis unless it includes a minimum number of classes, $N_{LFR}$. Since at time t1 that number of classes has not been reached yet, another received frame is likewise processed and analyzed, and its class is also added to LFR_DB 186, at time t2. LFR_DB 184 is filled with the minimum number of classes during the LFR time window, $T_{LFR}$, 920. The last class that fills LFR_DB 184 is the class associated with the frame received at time t5. LFR_DB 184 is deemed to be analyzable statistically at time t5, as per step 814 of FIG. 8. Therefore, the content of LFR_DB 184 is analyzed, for example, as per the method shown in FIG. 8. If the condition specified at step 816 is not satisfied, or this condition is satisfied but the condition specified at step 818 is not satisfied, a new frame, which is received at time t6, is processed and analyzed, and its class replaces the oldest class in LFR_DB 184. The replaced old class is related to the frame that was received at time t1. Accordingly, LFR_DB 184 contains classes pertaining to the frames that were received at times t2, t3, t4, . . . , t6.

As long as the condition specified at step 816 is not satisfied, or this condition is satisfied but the condition specified at step 818 is not satisfied, additional classes are likewise added to LFR_DB 184, to replace old classes. Therefore, unless both of the conditions specified at steps 816 and 818 are satisfied or Tm>Tmax (as per step 620 of FIG. 6), LFR time window, $T_{LFR}$, 920 keeps 'moving' rightward (with respect to the time axis) every time a new class replaces an old class in LFR_DB 184. Reference numeral 920' shows the LFR time window 920 moved rightward one 'step' (i.e., after replacing one old class with one new class); reference numeral 920"shows the LFR time window 920 moved rightward another step (i.e., after replacing another old class with another new class).

The time period 930 (between time t1 and time t5) may be thought of as a 'pre-analysis' period during which LFR_DB 184 is only filled with classes but no analysis of the classes takes place. The time period 940 (between time t5 and time t7) is an 'analysis period' during which LFR_DB 184 is already full with classes; its content is analyzed and, if required (as per steps 816 or 818), updated with new classes. Assume that at time t7 the condition of step 818 of FIG. 8 is satisfied; that is, a decision is made at step 818, at time t7, that the GI section currently traversed by the in-vivo device is the small bowel. As explained above, a decision at this stage, regarding transition of the in-vivo device to the small bowel, is non-decisive. The non-decisive decision is, therefore, reevaluated from time t7.

The time period 960 (the time between time t7 and time t8) may also be thought of as a 'pre-analysis' period because HFR_DB 186 is only filled with classes. The time period 970 (between time t8 and time t9) is an 'analysis period' during which the number of frame classes that are buffered in HFR_DB 186 is continuously increased, and its content is analyzed. Reference numeral 980 designates the minimum HFR time window, $T_{HFR\_min}$, during which HFR_DB 186 is filled with a minimum number of classes of frames, $N_{HFR\_min}$, before the classes can be statistically analyzed.

FIG. 9 shows a case where no decisive decision could be made during the maximum HFR time window, $T_{HFR\_Max}$, 990 with regard to transition of the in-vivo device to the small bowel. The in-vivo device operates in the LFR mode between time t1 and time t7, and then in the HFR mode between time t7 and time t8. Since no decisive decision could be made during $T_{HFR\_Max}$ 990, the in-vivo device resumes the LFR mode from time t9, and the process of analyzing frames, updating the two databases, and analyzing their content may recommence. If no decisive determination can be made before $T_{HFR\_Max}$ 990 elapses, the in-vivo device may transition from HFR mode to LFR mode, and vice versa, one or more times contingent on the updated content of the pertinent database. FIG. 9 shows a private case where no such transitions occur during the time period 970.

Reference numeral 950' shows the HFR time window 950 extended to the right by one 'step' (i.e., after adding one new class to HFR_DB 186); reference numeral 950"shows the HFR time window 950 extended to the right by another step (i.e., after adding another new class to HFR_DB 186). Reference numeral 905 is a LFR/HFR mode signal. In some embodiments, a LFR/HFR signal similar to signal 905 may be generated by in-vivo device 100 internally, for example by controller 130, in conjunction with units similar to FVU 174, FEE 180, FTC 182, etc. to change the in-vivo device's operation mode as per classes analysis. In other embodiments, a LFR/HFR signal similar to signal 905 may be generated by data recorder 160 and sent to controller 130 to effect a suitable operation mode at any given time.

Figure 10:
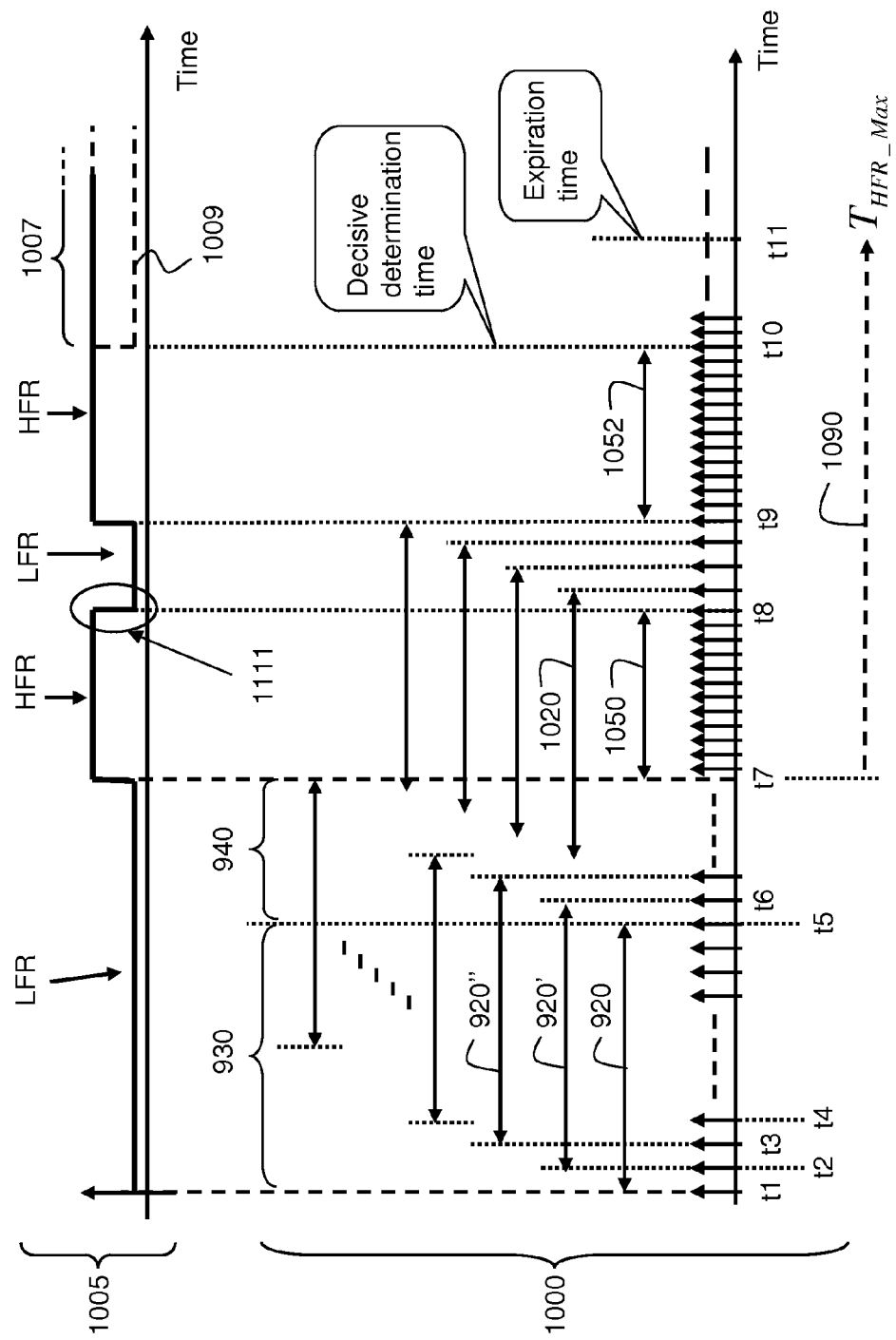
FIG. 10 shows an example time diagram for a case where a decisive transition determination is made before timeout is reached according to an embodiment of the invention.

FIG. 10 shows an example time diagram 1000 for a case where a decisive transition determination is made before timeout is reached. Time diagram 1000 is similar to time diagram 900, except that, in time diagram 1000, after the minimum HFR time window, $T_{HFR\_min}$, 1050 elapses (at time t8), analysis of HFR_DB 186 results in invalidation of the temporary determination that was made earlier (at time t7) to use the higher image capturing rate (HFR). Accordingly, at time t8, or a short time thereafter, the in-vivo resumes the lower image capturing rate (LFR). Between time t8 and time t9 the in-vivo device reuses the lower image capturing rate (LFR). It is noted that LFR_DB 184 is continuously updated with classes even after time t7 (e.g., with classes pertaining to HFR frames), as shown at 1020, which ensures that the content of LFR_DB 184 is ready for reanalysis, should the need arise (e.g., between time t8 and time t9). Therefore, the full length of time initially required to fill LFR_DB 184 with classes, such as from time t1 to time t5, is spared, thus enabling the decision, regarding transition of the in-vivo device to the target section, to be made in a shorter time. For example, if the time period 920 equals to, say, 8 minutes, the time required to return to the higher image capturing rate (e.g., the period t8-t9) may be significantly less than 8 minutes, for example it may be 3 minutes.

Assume that at time t9 it is temporarily determined again that the in-vivo device is to capture images at the higher rate (HFR). Accordingly, at time t9, or shortly thereafter, the HFR mode is reused and HFR_DB 186 is refilled with HFR classes during time period $T_{HFR\_min}$ 1052, between time t9 and time t10. Assume that prior to the expiration of the maximum time window $T_{HFR\_Max}$ 1090 (prior to time t11), for example at time t10, it is decided again (i.e., after the temporary decision made at time t9) that the in-vivo device has entered into the target section. Accordingly, at time t10 the determination, regarding transition of the in-vivo device to the target section, is regarded as a decisive determination, or the temporary determination made at time t9 may be validated at time t10. Put another way, when the classes analysis process is commenced, the in-vivo device captures images at a relatively slow rate (e.g., LFR), and classes collected by using the slow imaging rate facilitate generation of a preliminary indication (e.g., at time t7 in FIG. 10) that the in-vivo device has entered a target GI section. In order to accelerate a final decision that the in-vivo device is, indeed, in the target GI section, the in-vivo device increases the image capturing rate, as shown between time t7 and time t8. If the target GI section cannot be deduced from the currently collected classes, the in-vivo device reduces the image capturing rate, as shown at time t8 in FIG. 10, and classes are continued to be collected using the lower image capturing rate in order to obtain a new preliminary indication, as shown at time t9 in FIG. 10. If it is determined, while the higher image capturing rate is used, that the in-vivo device is in the target GI section, that determination is mad final and, as a result of the final determination, the HFR mode may be maintained from time t10 throughout the rest of the GI imaging procedure, as shown at 1007 by the thick line, or the lower images capturing rate (LFR) may be reused, as shown at 1009 by the broken line, or a certain procedure may be executed, or the in-vivo device may be instructed to refrain from executing a procedure, etc.

FIG. 10 demonstrates one transition from HFR mode to LFR mode (shown at 1111) between time t7 and time t10, the time at which a decisive determination is made. However, this is only an example case: in other cases several transitions HFR→LFR→HFR→LFR→, . . . , may take place between these times. Every HFR→LFR transition within the maximum time window $T_{HFR\_Max}$ delays the decisive determination. If the cumulative delay results in the elapsing of the maximum time window $T_{HFR\_Max}$ (shown at 1090), then the in-vivo device may resume the LFR operation and the whole transition determination process may start anew.

Reference numeral 1005 is a LFR/HFR mode signal. In some embodiments, a LFR/HFR signal similar to signal 1005 may be generated by in-vivo device 100 internally, for example by controller 130, in conjunction with units similar to FVU. 174, FFE 180, FTC 182, etc. to change the in-vivo device's operation mode as per classes analysis. In other embodiments, a LFR/HFR signal similar to signal 1005 may be generated by data recorder 160 and transferred to controller 130 to make the in-vivo device operate at a suitable mode at any given time.

Unless specifically stated otherwise, as apparent from the following discussions, it is appreciated that throughout the specification discussions utilizing terms such as "processing", "computing", "storing", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The articles "a" and "an" are used herein to refer to one or to more than one (i.e., at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium such as for example a memory, a disk drive, or a USB flash memory encoding, including or storing instructions, e.g., computer-executable instructions, which when executed by a processor or controller, cause the processor or controller to carry out methods disclosed herein.

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules. For example, classifying frames/images, analyzing the classes statistically, determining transition to a target GI section, etc., and determining the operation mode of in-vivo device 100 may be performed, mutatis mutandis, by in-vivo device 100.

The invention claimed is:

1. A method for detecting the movement of an in-vivo device between sections of a gastrointestinal (GI) tract, comprising:
    for a stream of image frames, each of the frames comprising an image captured in vivo by an in in-vivo device traversing the GI tract and related non-image data;
    sequentially classifying frames from the stream of frames, as being associated with a GI region based on the image data, the classifying producing frame classes;
    analyzing the frame classes; and
    determining whether the in-vivo device is in a particular GI section based on the analysis.

2. The method as in claim 1, comprising, for each frame class:
    storing the frame class in a storage device;
    if the number of frame classes stored in the storage device is smaller than a statistically sufficient number of frame classes, adding to the storage device additional one or more frame classes; and
    if the number of classes stored in the storage device is equal to or greater than the statistically sufficient number of frame classes, analyzing the stored frame classes and temporarily determining whether the in-vivo device is in a GI section based on the analysis result.

3. The method of claim 1, comprising classifying frames from the stream of frames as not being associated with any particular GI region.

4. A method for detecting transition of an in-vivo device between sections of the gastrointestinal (GI) system, comprising:
    a) receiving a stream of frames, each of the frames comprising image data corresponding to an image captured in vivo by an in in-vivo device traversing the GI tract and related non-image data;
    b) classifying frames from the stream of frames, one frame at a time, as related to a particular GI section or as not related to any particular GI section based on image data, wherein each frame to be classified is classified by the time the next frame to be classified is received, the classifying producing frame classes;

c) analyzing the frame classes statistically; and d) determining whether the in-vivo device is in a particular GI section or has transitioned to a particular GI section based on the analysis.

5. The method as in claim 4, comprising:

if it is determined that the in-vivo device is in a particular GI section or has transitioned to a particular GI section, generating a corresponding indication, and if no determination can be made regarding the location of the in-vivo device in the GI system or regarding the transition of the in-vivo device to the particular GI section, repeating operations b) to d) with additional one or more frames.

6. The method as in claim 5, comprising selection of frames for classification is contingent on a rate at which the in-vivo device captures images or transfers the stream of frames.

7. The method as in claim 4, wherein the determination includes determining whether the in-vivo device transitions from a particular section of the GI tract to an adjacent section of the GI tract.

8. The method as in claim 4, wherein the class of a frame is selected from the group consisting of invalid frame, stomach frame, small bowel frame, colon frame and rejected frame.

9. The method as in claim 4, wherein classifying a particular frame is based on any one of: a feature derived from imaging parameters pertaining to the particular frame, imaging parameters pertaining to a classified frame preceding the particular frame and imaging parameters pertaining to a classified frame following the particular frame; features derived from color information pertaining to the pertinent image, and features derived from non-image information related to the frame.

10. The method as in claim 4, wherein operations b) to d) are repeated with additional one or more frames until a determination is made regarding the location of the in-vivo device in a particular GI section or transition thereof to a particular GI section, or until a timeout is reached.

11. The method as in claim 4, comprising, for each frame class:

(a) buffering the frame class in a class buffer;

(b) if the number of frame classes buffered in the class buffer is smaller than a statistically sufficient number of frame classes, updating the class buffer with additional one or more frame classes;

(c) if the number of classes buffered in the classes buffer is equal to or greater than the statistically sufficient number of frame classes, analyzing the buffered frame classes and temporarily determining whether the in-vivo device has transitioned to a target GI section based on the analysis result, and if no determination can be made regarding the transition, repeating operations (a) and (c) for the next classified frame.

12. The method as in claim 11, further comprising:

(d) updating the class buffer with additional one or more frame classes, and after each update, analyzing the frame classes in the updated class buffer and, based on the analysis result, (i) validating the temporary determination, or (ii) invalidating the temporary determination and repeating operation (d).

13. The method as in claim 12, comprising:

transitioning the in-vivo device from a first image capturing rate to a second image capturing rate if a transition of the in-vivo device from a first GI section to a second GI section is determined.

14. The method as in claim 13, wherein the frame class associated with each image frame is buffered in a first database of the class buffer if the pertinent image is captured using the first image capturing rate, and in a second database of the class buffer if the pertinent image is captured using the second image capturing rate.

15. The method as in claim 14, wherein transitioning of the in-vivo device from the first image capturing rate to the second image capturing rate is temporary if the transition of the in-vivo device to the second GI section is determined based on statistical analysis of the first database, and permanent if it is determined based on statistical analysis of the second database.

16. An in vivo imaging system for detecting transition of an in-vivo device to a target GI section, comprising:

a memory to store a stream of frames, each of the frames comprising image data corresponding to an image captured in vivo by an in in-vivo device traversing the GI tract and related non-image data; and a processor to:

classify frames from the stream of frames, one frame at a time, as related to a particular GI section or as not related to any particular GI section based on image data, wherein each frame to be classified is classified by the time the next frame to be classified is received, the classifying producing frame classes;

analyze the frame classes statistically; and determine whether the in-vivo device is in a particular GI section or has transitioned to a particular GI section based on the analysis.

17. The system of claim 16, wherein:

if it is determined that the in-vivo device is in a particular GI section or has transitioned to a particular GI section, the processor is to generate a corresponding indication, and if no determination can be made regarding the location of the in-vivo device in the GI system or regarding the transition of the in-vivo device to the particular GI section, the processor is to repeat the classification, analysis and determining operations.

18. The system of claim 16, comprising selection of frames for classification contingent on a rate at which the in-vivo device captures images or transfers the stream of frames.

19. The system of claim 16, wherein the determination includes determining whether the in-vivo device transitions from a particular section of the GI tract to an adjacent section of the GI tract.

20. The system of claim 16, wherein the class of a frame is selected from the group consisting of invalid frame, stomach frame, small bowel frame, colon frame and rejected frame.

* * * * *